(12) United States Patent
Chakankar et al.

(10) Patent No.: US 11,663,171 B2
(45) Date of Patent: May 30, 2023

(54) EFFICIENT DATABASE MIGRATION USING AN INTERMEDIARY SECONDARY STORAGE SYSTEM

(71) Applicant: Cohesity, Inc., San Jose, CA (US)

(72) Inventors: Abhijit Chakankar, San Jose, CA (US); Manoj Singhal, Sunnyvale, CA (US); Warren Shen, Sunnyvale, CA (US); Sashikanth Madduri, Mountain View, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/161,382

(22) Filed: Jan. 28, 2021

(65) Prior Publication Data

US 2021/0149848 A1 May 20, 2021

Related U.S. Application Data

(63) Continuation of application No. 16/250,828, filed on Jan. 17, 2019, now Pat. No. 10,942,902.

(51) Int. Cl.
*G06F 16/182* (2019.01)
*G06F 16/18* (2019.01)
*G06F 16/901* (2019.01)
*G06F 16/17* (2019.01)
*G06F 16/11* (2019.01)
*G06F 3/06* (2006.01)

(52) U.S. Cl.
CPC ......... *G06F 16/1844* (2019.01); *G06F 3/067* (2013.01); *G06F 3/0619* (2013.01); *G06F 3/0647* (2013.01); *G06F 16/128* (2019.01); *G06F 16/1734* (2019.01); *G06F 16/1873* (2019.01); *G06F 16/9027* (2019.01)

(58) Field of Classification Search
CPC ............ G06F 16/1844; G06F 16/1873; G06F 16/9027; G06F 16/1734; G06F 16/128; G06F 3/0619; G06F 3/0647; G06F 3/067
USPC ...................................................... 707/634
See application file for complete search history.

(56) References Cited

U.S. PATENT DOCUMENTS

| | | | |
|---|---|---|---|
| 5,193,154 A | 3/1993 | Kitajima | |
| 5,495,607 A * | 2/1996 | Pisello | G06F 16/168 707/812 |
| 7,185,192 B1 * | 2/2007 | Kahn | G06F 21/6218 707/999.102 |
| 9,116,633 B2 * | 8/2015 | Sancheti | H04L 67/1097 |
| 9,229,964 B2 * | 1/2016 | Stevelinck | G16H 70/60 |
| 9,323,758 B1 * | 4/2016 | Stacey | G06F 16/137 |
| 9,350,682 B1 * | 5/2016 | Gupta | G06F 9/45558 |
| 10,169,065 B1 * | 1/2019 | Nye | G06F 9/5088 |

(Continued)

*Primary Examiner* — Mark E Hershley

(74) *Attorney, Agent, or Firm* — Van Pelt, Yi & James LLP

(57) ABSTRACT

A portion of contents of a database is received from a first server. The received contents of the database is stored in a secondary storage system that tracks changes between different backup versions of contents of the database. A request to migrate the contents of the database to a second server is received. A version of contents of the database is provided to the second server using the secondary storage system. The secondary storage system is configured to determine an amount of changes to the database content from one of the versions of the database content provided to the second server and the amount of changes is utilized in determining whether to quiesce the database hosted on the first server.

19 Claims, 17 Drawing Sheets

(56) References Cited

U.S. PATENT DOCUMENTS

| | | | |
|---|---|---|---|
| 10,191,922 B2* | 1/2019 | Michael | G06F 16/214 |
| 10,282,433 B1* | 5/2019 | Caruso | G06F 16/258 |
| 10,346,216 B1* | 7/2019 | Yang | G06F 11/301 |
| 10,417,102 B2* | 9/2019 | Sanakkayala | H04L 43/10 |
| 10,740,353 B2* | 8/2020 | Horowitz | G06F 11/14 |
| 11,042,512 B1* | 6/2021 | Bono | G06F 11/1464 |
| 2003/0225884 A1* | 12/2003 | Hayden | G06F 3/0601 |
| | | | 709/214 |
| 2004/0015408 A1* | 1/2004 | Rauen, IV | G06Q 10/10 |
| | | | 705/26.81 |
| 2007/0220320 A1* | 9/2007 | Sen | G06F 11/1464 |
| | | | 714/E11.12 |
| 2007/0226535 A1* | 9/2007 | Gokhale | G06F 16/2365 |
| | | | 714/6.12 |
| 2007/0266056 A1* | 11/2007 | Stacey | G06F 16/185 |
| | | | 707/999.203 |
| 2009/0171731 A1* | 7/2009 | Bobak | G06Q 10/06313 |
| | | | 705/7.23 |
| 2009/0228532 A1* | 9/2009 | Anzai | G06F 16/119 |
| 2009/0276771 A1* | 11/2009 | Nickolov | H04L 67/1008 |
| | | | 718/1 |
| 2009/0313311 A1* | 12/2009 | Hoffmann | G06F 11/2097 |
| 2010/0332401 A1* | 12/2010 | Prahlad | G06F 3/0631 |
| | | | 711/E12.001 |
| 2013/0085998 A1* | 4/2013 | Barker | G06F 9/5088 |
| | | | 707/649 |
| 2013/0110770 A1* | 5/2013 | Stevelinck | G06F 16/214 |
| | | | 707/609 |
| 2013/0219138 A1* | 8/2013 | Nasu | G06F 3/0646 |
| | | | 711/E12.103 |
| 2014/0040199 A1* | 2/2014 | Golab | G06F 16/211 |
| | | | 707/634 |
| 2014/0149698 A1* | 5/2014 | Ezra | G06F 12/0864 |
| | | | 711/162 |
| 2014/0281306 A1* | 9/2014 | Nakajima | G06F 3/0685 |
| | | | 711/162 |
| 2015/0006476 A1* | 1/2015 | Engelko | G06F 16/214 |
| | | | 707/609 |
| 2015/0149416 A1* | 5/2015 | Dhavale | G06F 16/2308 |
| | | | 707/687 |
| 2015/0205674 A1* | 7/2015 | Schroth | G06F 11/1458 |
| | | | 707/649 |
| 2015/0244775 A1* | 8/2015 | Vibhor | G06F 11/0772 |
| | | | 709/203 |
| 2016/0034481 A1* | 2/2016 | Kumarasamy | G06F 16/128 |
| | | | 707/639 |
| 2016/0086260 A1* | 3/2016 | Vermeulen | G06Q 40/00 |
| | | | 705/35 |
| 2017/0031780 A1* | 2/2017 | Biewald | G06F 11/0751 |
| 2017/0124038 A1* | 5/2017 | Upadhyay | G06F 40/166 |
| 2017/0199770 A1* | 7/2017 | Peteva | G06F 9/5088 |
| 2017/0235587 A1* | 8/2017 | Vully | G06F 16/188 |
| | | | 718/1 |
| 2017/0235950 A1* | 8/2017 | Gopalapura Venkatesh | |
| | | | G06F 16/1774 |
| | | | 726/24 |
| 2017/0286517 A1* | 10/2017 | Horowitz | G06F 11/0754 |
| 2017/0286518 A1* | 10/2017 | Horowitz | G06F 11/14 |
| 2017/0344618 A1* | 11/2017 | Horowitz | G06F 11/2097 |
| 2018/0129693 A1* | 5/2018 | Chatterjee | G06F 16/2343 |
| 2018/0137113 A1* | 5/2018 | Kurz | G06F 16/214 |
| 2018/0137139 A1* | 5/2018 | Bangalore | G06F 16/2379 |
| 2018/0225177 A1* | 8/2018 | Bhagi | G06F 16/119 |
| 2018/0232285 A1* | 8/2018 | Kumarasamy | G06F 16/113 |
| 2018/0276085 A1* | 9/2018 | Mitkar | G06F 11/1451 |
| 2018/0288150 A1* | 10/2018 | Wang | G06F 11/3006 |
| 2018/0373708 A1* | 12/2018 | Martin | G06F 16/2246 |
| 2019/0205455 A1* | 7/2019 | Jugel | G06F 16/24 |
| 2019/0306236 A1* | 10/2019 | Wiener | H04L 41/0897 |
| 2020/0073802 A1* | 3/2020 | Pradhan | G06F 11/1435 |
| 2020/0104376 A1* | 4/2020 | Earnesty, Jr. | G06F 16/285 |

* cited by examiner

EFFICIENT DATABASE MIGRATION USING AN INTERMEDIARY SECONDARY STORAGE SYSTEM

CROSS REFERENCE TO OTHER APPLICATIONS

This application is a continuation of U.S. patent application Ser. No. 16/250,828, entitled EFFICIENT DATABASE MIGRATION USING AN INTERMEDIARY SECONDARY STORAGE SYSTEM filed Jan. 17, 2019 which is incorporated herein by reference for all purposes.

BACKGROUND OF THE INVENTION

A database may be associated with one or more files. The database may be associated with a primary database file, which contains the schema and data. The database may also be associated with a log file, which contains logging information for all transactions completed by the server on which the database is running.

The one or more files associated with the database may occupy a large amount of storage (e.g., 10 TB). The one or more files associated with the database may be migrated to a second server. It may take a long period of time (e.g., 10 hours) to migrate the data associated with the one or more files. The database may be quiesced to prevent the one or more files associated with the database from being inconsistent with the one or more migrated files associated with the database. Such an amount of downtime associated with the database may be unacceptable and/or impractical for users associated with the database.

BRIEF DESCRIPTION OF THE DRAWINGS

Various embodiments of the invention are disclosed in the following detailed description and the accompanying drawings.

DETAILED DESCRIPTION

Figure 1A:
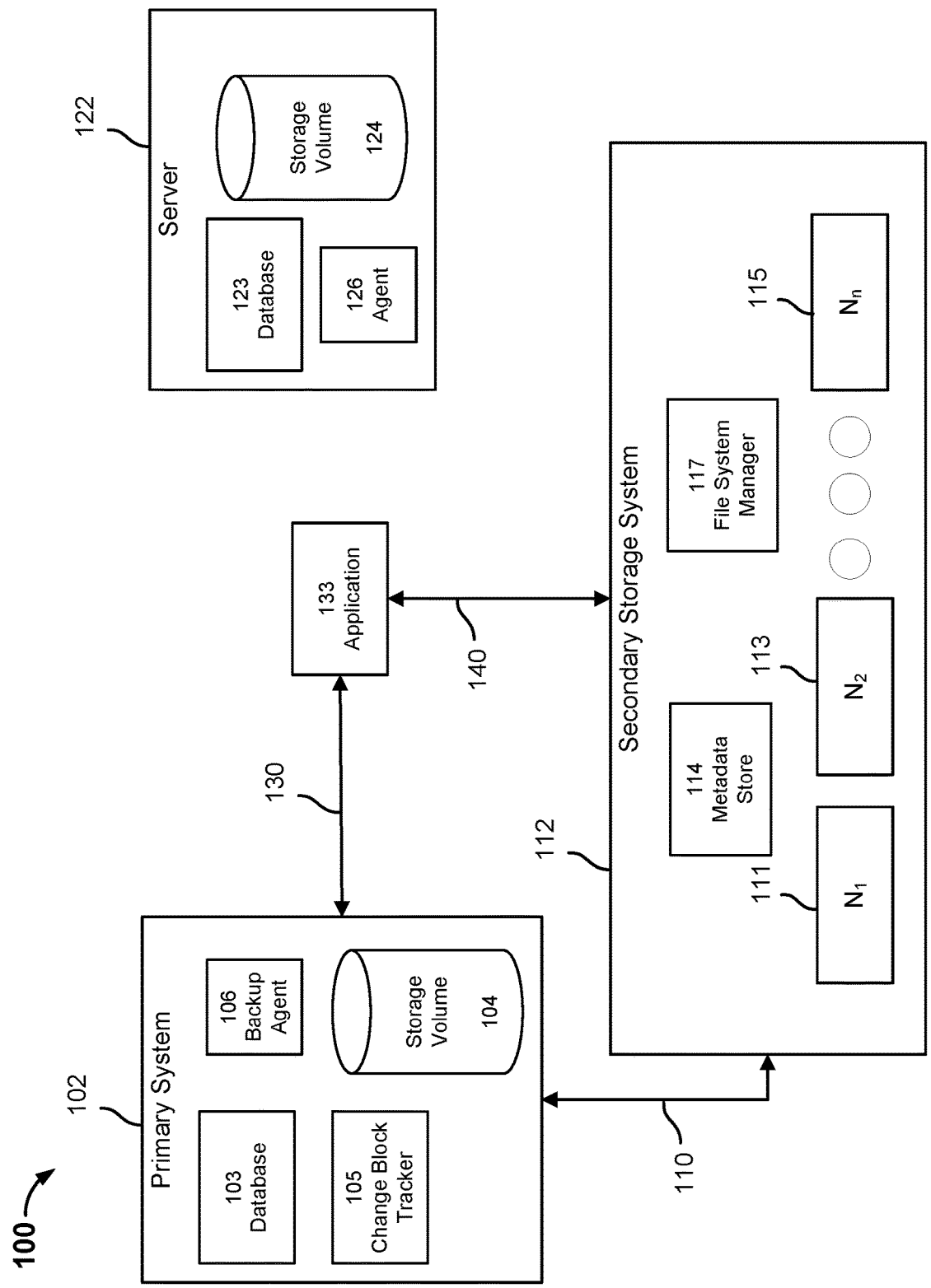
FIG. 1A is a block diagram illustrating an embodiment of a system for migrating database content.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A primary system may include a database and store data associated with the database in one or more database files. The one or more database files may include a primary database file and a log file. A secondary storage system may cause the primary system to perform a backup snapshot according to a backup snapshot policy and store the backup snapshot to the secondary storage system. A backup snapshot represents the state of the primary system at a particular point in time (e.g., the state of the file system data). The backup snapshot may include data of the one or more database files. The backup snapshot may be a full backup snapshot or an incremental backup snapshot. A full backup snapshot stores the entire state of the primary system at the particular point in time and includes all of the data associated with the one or more database files. An incremental backup snapshot includes the data associated with the primary system that were not backed up in a previous backup snapshot and may include the data associated with the one or more database files that was not backed up in a previous backup snapshot.

A secondary storage system may ingest and store the file system data of the backup snapshot. A file system manager of the secondary storage system may organize the file system data of the backup snapshot using a tree data structure. An example of the tree data structure is a snapshot tree (e.g., Cohesity Snaptree), which may be based on a B+ tree structure (or other type of tree structure in other embodiments). The tree data structure provides a view of the file system data corresponding to a backup snapshot. The view of the file system data corresponding to the backup snapshot is comprised of a file system metadata snapshot tree and one or more file metadata trees. A file metadata tree is a snapshot structure that stores the metadata associated with a file and may correspond to one of the files included in the backup snapshot. For example, a file metadata tree may correspond to one of the database files (e.g., primary database file, log file, etc.)

A file system metadata snapshot tree is a representation of a fully hydrated backup because it provides a complete view of the primary system at a particular moment in time. A fully hydrated backup is a backup that is ready for use without having to reconstruct a plurality of backups to use it. Conventional systems may reconstruct a backup by starting with a full backup and applying one or more changes associated with one or more incremental backups to the data associated with the full backup. In contrast, any file stored on the primary system at a particular time and the file's contents, for which there is an associated backup snapshot, may be determined from the file system metadata snapshot tree, regardless if the associated backup snapshot was a full backup snapshot or an incremental backup snapshot. Creating an incremental backup snapshot of a primary system may include only copying data of the primary system that was not previously backed up. However, a file system metadata snapshot tree corresponding to an incremental backup snapshot provides a complete view of the primary system at the particular moment in time because it includes references to data of the primary system that was previously stored. For example, a root node associated with the file system metadata snapshot tree may include one or more references to nodes associated with one or more previous backup snapshots and one or more references to nodes associated with the current backup snapshot. This provides significant savings in the amount of time needed to restore, recover, or replicate a database file. In contrast, traditional recovery/restoration methods may require significant time, storage, and computational resources to reconstruct a particular version of a database file from a full backup and a series of incremental backups.

An operator associated with the database hosted on the primary system may desire to use an upgraded database. Database content that includes one or more database files may migrated from the secondary storage system to a server hosting the upgraded database. However, the one or more database files may be quite large (e.g., 10 TB). It may take a long period of time (e.g., 10 hours) for the data associated with the one or more database files to be migrated from the secondary storage system to a server hosting the upgraded database. One conventional solution is to quiesce the database running on the primary system and migrate the data associated with the one or more database files. The database may be quiesced to ensure that the one or more database files associated with the upgraded database are consistent with the one or more database files associated with the database. The database may receive tens, hundreds, even thousands of database requests (e.g., reads/writes) per second from a plurality of users. The number of unfulfilled database requests increases each second that the database is offline. Such a conventional solution may result in an unacceptable amount of downtime for the database.

A technique to reduce the amount of downtime associated with upgrading from a first database version to a second database version is disclosed. The data associated with one or more database files may be stored at a secondary storage system and provided from the secondary storage system to a server hosting the upgraded version of the database (i.e., the second database version). One or more users associated with the database hosted on a primary system may continue to use the database (i.e., the first database version) while the data associated with the one or more database files is being migrated in the background from the secondary storage system to the server hosting the upgraded version of the database. The secondary storage system may be used to migrate the database content instead of the primary system to free up system resources of the primary system for other purposes, such as to respond to one or more database requests. The primary system may also perform one or more incremental backup snapshots to the secondary storage system while the data associated with the one or more database files is being migrated in the background from the secondary storage system to the server hosting the upgraded version of the database. The one or more incremental backup snapshots may include data associated with the one or more database files that was not previously backed up.

After the data migration is completed, the one or more database files that are stored on the primary system may be inconsistent with the one or more database files that are stored on the server hosting the upgraded version of the database. The secondary storage system may provide to an application associated with an operator of the current version of the database an estimated amount of time to migrate a remaining portion of the one or more database files. The remaining portion of the one or more database files corresponds to the additional portion of the one or more database files that was backed up from the primary system to the secondary storage system while the initial portion of the one or more database files was migrated from the secondary storage system to the server hosting the upgraded version of the database. The remaining portion represents the portion of the one or more database files needed to make the one or more database files that are stored on the primary system consistent with the one or more database files that are stored on the server hosting the upgraded version of the database.

In some embodiments, the application associated with an operator of the current version of the database may provide to the user an option to quiesce the database and migrate the remaining portion from the secondary storage system to the server hosting the upgraded version of the database. The operator may decline to quiesce the database because the amount of downtime associated with the database running on the primary system is too long. For example, it may take an hour to migrate the remaining portion of the one or more database files. In the event the operator of the current version of the database declines to quiesce the database and migrate the remaining portion of the one or more database files, the secondary storage system may be configured to migrate the remaining portion of the one or more database files and the one or more users associated with the database may continue to use the database while the remaining portion of the one or more database files is being migrated in the background from the secondary storage system to the server hosting the upgraded version of the database. The primary system may also perform one or more incremental backup snapshots while the remaining portion of the one or more database files is being migrated in the background from the secondary storage system to the server hosting the upgraded database. The one or more incremental backup snapshots may include data associated with the one or more database files that was not previously backed up. In the event the operator of the current version of the database agrees to quiesce the database and migrate the remaining portion of the one or more database files (e.g., the amount of downtime is not too long), the database is quiesced and the secondary storage system migrates the remaining portion of the one or more database files to the server hosting the upgraded version of the database. The operator of the current version of the database and upgraded version of the database may decide that the amount of downtime is acceptable.

In other embodiments, the database is automatically quiesced and the remaining portion of the one or more database files is migrated from the secondary storage system to the server hosting the upgraded version of the database in the event the amount of downtime associated with the data migrate is less than a downtime threshold (e.g., 1 minute). The downtime threshold may be specified by an operator associated with the database.

After the migration of the remaining portion of the one or more database files is completed, the application associated with an operator of the current version of the database may provide to the operator an option to quiesce the database and migrate a second remaining portion to the server hosting the upgraded version of the database. In other embodiments, the database is automatically quiesced and the second remaining portion of the one or more database files is migrated from the secondary storage system to the server hosting the upgraded version of the database in the event the amount of downtime associated with the data migrate is less than a downtime threshold (e.g., 1 minute). The second remaining portion corresponds to the data associated with the one or more database files was backed up from the primary system to the secondary storage system while the remaining portion of the one or more database files were being migrated from the secondary storage system to the server hosting the upgraded version of the database.

The one or more database files that are stored on the primary system may still be in an inconsistent state with the one or more database files stored on the server hosting the upgraded version of the database. The application associated with an operator of the current version of the database may provide the operator associated with the database, an option to quiesce the database and to migrate the data needed to make the one or more database files stored on the primary system and the server hosting the upgraded version of the database consistent with each other. In other embodiments, the database is automatically quiesced and the remaining portion of the one or more database files is migrated from the secondary storage system to the server hosting the upgraded version of the database in the event the amount of downtime associated with the data migrate is less than a downtime threshold (e.g., 1 minute).

The cycle of migrating in the background a remaining portion of one or more database files to the server hosting the upgraded version of the database and determining whether to quiesce the database may continue until the amount of downtime is an acceptable amount of downtime.

In some embodiments, an operator associated with the database decides whether to quiesce the database. In other embodiments, the database is automatically quiesced in the event the amount of downtime is less than a downtime threshold. In the event an operator associated with the database decided to quiesce the database or the amount of downtime associated with quiescing the database is less than a downtime threshold, the database is quiesced and the remaining portion of the one or more database files are migrated from the secondary storage system to the server hosting the upgraded version of the database. After the data migration is completed, the one or more users associated with the database may be reassigned to become one or more users associated with the upgraded version of the database.

Each time the remaining portion is migrated and the one or more users continue to use the database, the amount of downtime associated with the next migration may decrease. For example, it may take 10 hours to perform an initial migration instance that includes the initial portion of the one or more database files, a hour to perform a second migration instance that includes a first remaining portion of the one or more database files, thirty minutes to perform a third migration instance that includes a second remaining portion of the one or more database files, . . . , and less than a minute to perform an nth migration instance that includes an (n−1)th remaining portion of the one or more database files. The technique to reduce the amount of downtime associated with upgrading from a first database version to a second database version not only reduces the amount of downtime associated with a database, but also ensures that the one or more database files stored on the primary system and the one or more database files stored on the server hosting the upgraded database are in sync with each other before additional changes are made to the one or more databases files.

FIG. 1A is a block diagram illustrating an embodiment of a system for migrating database content. In the example shown, system 100 includes primary system 102, secondary storage system 112, server 122, and application 133.

Primary system 102 is a computing system comprised of one or more servers, one or more computing devices, one or more storage devices, and/or a combination thereof. Primary system 102 is comprised of database 103, storage volume 104, change block tracker 105, and backup agent 106. Primary system 102 may be a database server.

Database 103 may be a computer program that is configured to enter and retrieve information from a computerized database. Examples of database 103 include, but are not limited to, SQL Server, Oracle Database, Sybase, Informix, MySQL, etc. Database 103 may correspond to a first version of the database. Database 103 may be associated with one or more database files. One of the database files may be a primary database file. A primary database file is a file that contains the schema and data associated with a database. One of the database files may be a log file. A log file is a file that stores information for all database transactions completed by primary system 102. Database 103 may be quiesced in response to a command. In some embodiments, the command is received from backup agent 106. In other embodiments, the command is received from application 133. In other embodiments, the command is received from a user interface (not shown) associated with primary system 102. Database 103 may be quiesced to pause operations associated database 103.

The one or more database files may be stored in storage volume 104. Storage volume 104 may be configured to store the file system data associated with primary system 102. The file system data may include the one or more database files, one or more non-database files, and metadata associated with storage volume 104.

Change block tracker 105 may be configured to maintain a map of the one or more changes to the file system data associated with primary system 102. For example, change block tracker 105 may maintain a map of the one or more changes to the one or more database files. Primary system 102 may be configured to perform a full backup snapshot or an incremental backup snapshot. A full backup snapshot includes all of the file system data stored in storage volume 104. An incremental backup snapshot includes all of the file system data that was not previously backed up. The incremental backup snapshot may include data associated with one or more database files that was not previously backed up. Change block tracker 105 may be used to identify the file system data and data associated with the one or more database files that was not previously backed up. The map associated with change block tracker 105 may be cleared after a backup snapshot is performed.

Backup agent 106 may cause primary system 102 to perform a backup snapshot and to send to secondary storage system 112 file system data stored in storage volume 104. The backup snapshot may be a full backup snapshot or an incremental backup snapshot. Backup agent 106 may receive from secondary storage system 112 a command to perform a backup snapshot.

Primary system 102 is coupled to secondary storage system 112 via network connection 110. Connection 110 may be a wired connection or a wireless connection.

Secondary storage system 112 is a storage system configured to ingest and store file system data received from primary system 102 via connection 110. Secondary storage system 112 may be comprised of one or more storage nodes 111, 113, 115. Each storage node may have its own corresponding processor. The one or more storage nodes may be one or more solid state drives, one or more hard disk drives, or a combination thereof. The file system data included in a backup snapshot may be stored in one or more of the storage nodes 111, 113, 115. In one embodiment, secondary storage system 112 is comprised of one solid state drive and three hard disk drives.

Secondary storage system 112 may include file system manager 117. File system manager 117 is configured to organize in a tree data structure the file system data received in a backup snapshot from primary system 102. An example of the tree data structure is a snapshot tree (e.g., Cohesity Snaptree), which may be based on a B+ tree structure (or other type of tree structure in other embodiments). The tree data structure provides a view of the file system data corresponding to a backup snapshot. The view of the file system data corresponding to the backup snapshot may be comprised of a snapshot tree and a plurality of file metadata trees. A file metadata tree may correspond to one of the files included in the backup snapshot. The file metadata tree is a snapshot structure that stores the metadata associated with the file. For example, a file metadata tree may correspond to a database file. File system manager 117 may be configured to perform one or more modifications, as disclosed herein, to a snapshot tree and a file metadata tree. The snapshot tree and file metadata trees may be stored in metadata store 114. The metadata store 114 may store the view of file system data corresponding to a backup snapshot. The metadata store may also store data associated with content files that are smaller than a limit size.

The tree data structure may be used to capture different versions of backup snapshots. The tree data structure allows a chain of snapshot trees corresponding to different versions of backup snapshots (i.e., different snapshot tree versions) to be linked together by allowing a node of a later version of a snapshot tree to reference a node of a previous version of a snapshot tree (e.g., a "snapshot tree forest"). For example, a root node or an intermediate node of a second snapshot tree corresponding to a second backup snapshot may reference an intermediate node or leaf node of a first snapshot tree corresponding to a first backup snapshot.

A snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata, data associated with a file that is less than a limit size, an identifier of a data brick, a pointer to a file metadata tree (e.g., Blob structure), or a pointer to a data chunk stored on the secondary storage system.

Data associated with a file that is smaller than or equal to a limit size (e.g., 256 kB) may be stored in a leaf node of the snapshot tree. A leaf node may be an index node (inode). A file metadata tree may be generated for a file that is larger than the limit size. The file metadata tree is a snapshot structure and is configured to store the metadata associated with a version of a file. The file may correspond to a database file.

The file metadata tree includes a root node, one or more levels of one or more intermediate nodes associated with the root node, and one or more leaf nodes associated with an intermediate node of the lowest intermediate level. The tree data structure associated with a file metadata tree allows a chain of file metadata trees corresponding to different versions of a file to be linked together by allowing a node of a later version of a file metadata tree to reference a node of a previous version of a file metadata tree. For example, a root node or an intermediate node of a second file metadata tree corresponding to a second version of a database file may reference an intermediate node or leaf node of a first file metadata tree corresponding to a first version of the database file.

A leaf node of a file metadata tree includes an identifier of a data brick associated with one or more data chunks of the file or a pointer to the data brick associated with one or more data chunks of the file. For example, a file metadata tree may correspond to a database file and a leaf node of the file metadata tree may include a pointer to or an identifier of a data brick associated with one or more data chunks of the database file. A data brick may include one or more data chunks. In some embodiments, the size of a brick is 256 kB. The data brick may include one or more data chunks. The one or more data chunks may be of variable length within a particular range (e.g., 4 kB to 64 kB).

The location of the data brick may be identified using a data structure (e.g., list, table, etc.) stored in metadata store 114 that matches brick identifiers to a physical storage location or the location of the data brick may be identified based on the pointer to the data brick. In some embodiments, the data structure associates brick identifiers with chunk identifiers (e.g., hashes). The data structure or a different data structure may associate chunk identifiers with a brick offset. A chunk may be associated with a chunk table, which contains a corresponding chunk file ID. The chunk file ID is associated with a chunk file table, which indicates the location of the data (e.g., an offset in a data brick).

A chunk identifier (e.g., hash) may be computed for a data chunk. The chunk identifier may be compared to entries included in a data structure that stores chunk identifiers associated with data chunks stored by the secondary storage system. In the event the computed chunk identifier matches an entry of the data structure (e.g., hash dictionary), a reference to the previously stored chunk having the computed chunk identifier may be stored in the brick.

Server 122 is a computing system comprised of one or more servers, one or more computing devices, one or more storage devices, and/or a combination thereof. Server 122 may be comprised of database 123 and storage volume 126.

Database 123 may be a second version (e.g., newer version) of database 103. Examples of database 123 include, but are not limited to, SQL Server, Oracle Database, Sybase, Informix, MySQL, etc. Database 103 may correspond to a first version of the database. Database 123 may be associated with one or more database files. One of the database files may be a primary database file. Another one of the database files may be a log file. The one or more database files may be stored in storage volume 124. Storage volume 124 may be configured to store the file system data associated with server 122. The file system data may include the one or more database files, one or more non-database files, and/or metadata associated with storage volume 124. Server 122 may include agent 126. Agent 126 may be configured to organize the data associated with the one or more migrated database files in a manner that is accessible by database 123.

Application 133 may be coupled to primary system 102 and secondary storage system 112 via network connection 130 and network connection 140, respectively. Application 133 may be running on a client device (not shown). In other embodiments, application 133 is hosted on a cloud server running in a cloud environment (e.g., Amazon Web Services, Microsoft Azure, Google Cloud, etc.). An operator associated with database 103 may access application 133 via a network connection (not shown).

Application 133 may be configured to provide an operator associated with database 103 via a user interface of the client device an estimated amount of time needed to migrate from secondary storage system 112 to server 122 one or more database files. The estimated amount of time may be based on the total amount of data associated with the one or more database files. The estimated amount of time may be based on a current workload associated with secondary storage system 112.

Application 133 may be configured to receive from an operator associated with database 103 a command to quiesce database 103. In response to receiving the command, application 133 may provide to primary system 102 the command to quiesce database 103. Primary system 102 may quiesce database 103 in response to the command.

Application 133 may be configured to provide to secondary storage system 112 via network connection 140 a command to migrate one or more database files to server 122. In response to receiving the command, secondary storage system 122 may migrate the one or more database files to server 122.

Figure 1B:
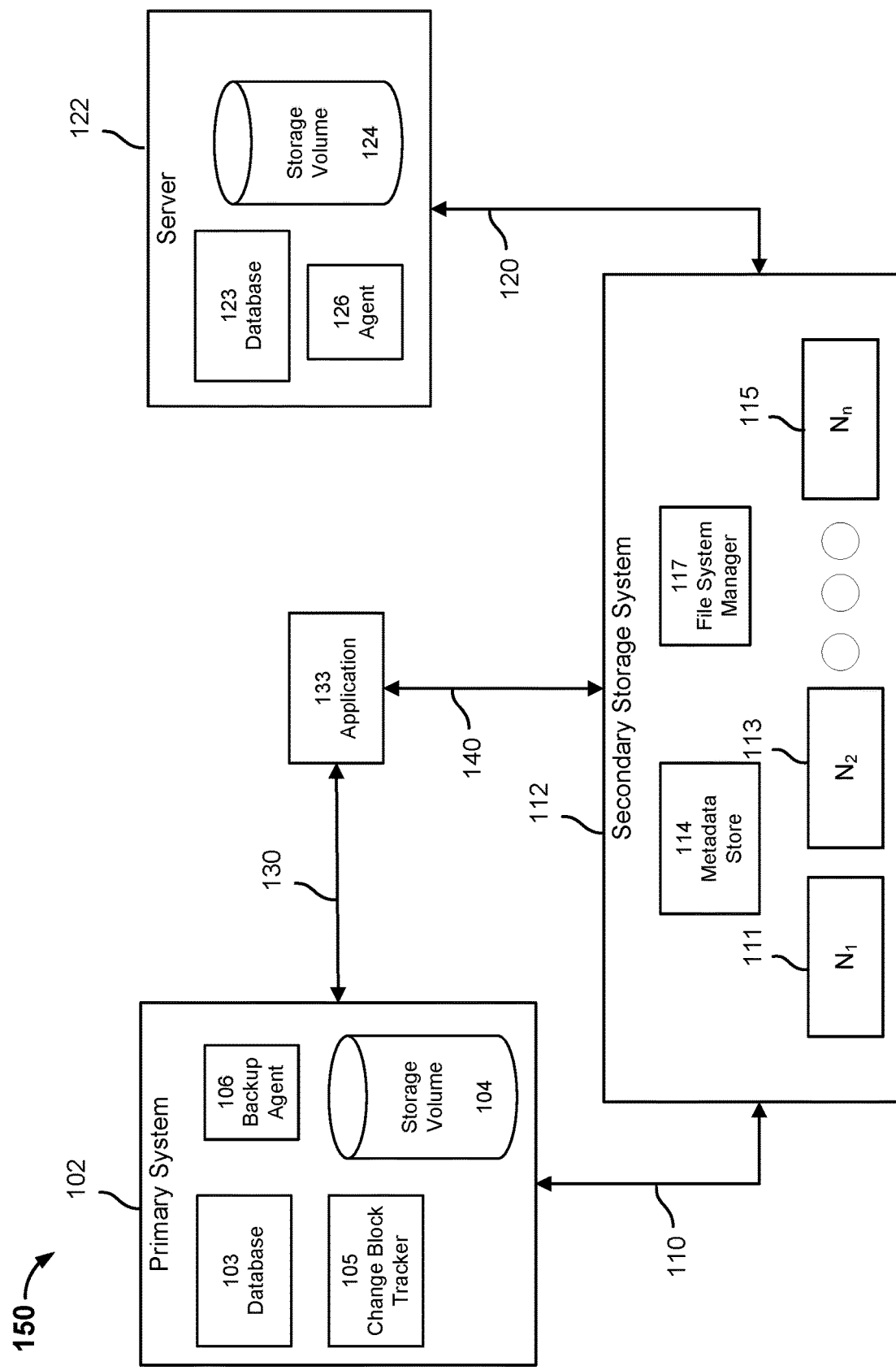
FIG. 1B is a block diagram illustrating an embodiment of a system for migrating database content.

FIG. 1B is a block diagram illustrating an embodiment of a system for migrating database content. In the example shown, system 150 includes primary system 102, secondary storage system 112, server 122, and application 133.

An operator associated with database 103 may desire to use an upgraded database, i.e., database 123. One or more database files associated with database 103 may migrated from secondary storage system 112 to server 122. In the example shown, an operator associated with database 103 has provided to application 133 a command to migrate from secondary storage system 112 to server 122 the one or more database files associated with database 103. The command may include a selection of a particular version of the one or more database files. Secondary storage system 112 may be used to migrate the database content instead of primary system 102 to free up system resources of primary system 102 for other purposes, such as to respond to one or more database requests.

The particular version of the one or more database files may be associated with a particular view of the file system data corresponding to a backup snapshot received from primary system 102. File system manager 117 may determine the particular view and traverse the tree data structure corresponding to the particular view to locate the data associated with the particular version of the one or more database files. Secondary storage system 112 may migrate to server 122 the data associated with the particular version of the one or more database files.

The one or more database files may be quite large (e.g., 10 TB). It may take a long period of time (e.g., 10 hours) for the data associated with the one or more database files to be migrated from secondary storage system 112 to server 122. To ensure that the database files are consistent with each other, database 103 may be quiesced while the one or more database files are being migrated from secondary storage system to server 122. However, database 103 may receive tens, hundreds, even thousands of database requests (e.g., reads/writes) per second from a plurality of users. The number of unfulfilled database requests increases each second that database 103 is offline. Such an amount of downtime for database 103 may be impractical and/or unacceptable. As a result, an operator associated with database 103 may decide to start the database migration without taking database 103 offline. One or more users associated with database 103 may continue to use database 103 while the one or more database files are being migrated from secondary storage system 112 to server 122.

Primary system 102 may perform one or more subsequent backup snapshots of file system data to secondary storage system 112 while the one or more database files are being migrated from secondary storage system 112 to server 122. The one or more subsequent backup snapshots may be incremental backup snapshots. Each incremental backup snapshot may include data that was not previously backed up. The one or more backup snapshots of file system data may include data associated with the one or more databases files that are being migrated. For example, the one or more users associated with database 103 may make one or more modifications to the one or more database files stored in storage volume 106 while the one or more database files are being migrated from secondary storage system 112 to server 122.

Secondary storage system 112 is configured to ingest and store file system data included in the one or more subsequent backup snapshots received from primary system 102. File system manager 117 is configured to update a tree data structure based on the file system data included in a backup snapshot received from primary system 102. Updating the tree data structure may include cloning a view associated with the last backup snapshot and performing one or more modifications to the cloned view based on the file system data included in the backup snapshot. The cloned view may include references to data associated with one or more previous backup snapshots and references to data associated with a current backup snapshot.

After the data migration of the one or more database files is completed, the one or more database files that are stored in storage volume 104 may be inconsistent with the one or more database files that are stored in storage volume 124. Secondary storage system 112 may store a copy of the one or more database files that are stored in storage volume 104. Secondary storage system 112 may determine an amount of time needed to migrate the remaining portion of the one or more database files from secondary storage system 112 to server 122. The remaining portion of the one or more database files corresponds to the data needed to make the one or more database files that are stored on primary system 102 consistent with the one or more database files that are stored on server 122.

Secondary storage system 112 may provide to application 133 a notification that includes the determined amount of time needed to migrate the remaining portion of the one or more database files. In some embodiments, in response to receiving the notification, application 133 may provide to an operator associated with database 103 via a user interface an indication of the determined amount of time needed to migrate the remaining portion of the one or more database files. The user interface may also provide the operator associated with database 103, the option to quiesce database 103 and migrate the remaining portion of the one or more database files from secondary storage system 112 to server 122 or the option to migrate in the background the remaining portion of the one or more database files from secondary storage system 112 to server 122 while one or more users associated with database 103 may continue to use database 103.

The operator associated with database 103 may decline to quiesce database 103 because the amount of downtime associated with database 103 is too long. For example, it may take an hour to migrate the remaining portion of the one or more database files. In the event the operator of database 103 declines to quiesce database 103 and migrate the remaining portion of the one or more database files, secondary storage system 112 may be configured to migrate the remaining portion of the one or more database files and the one or more users associated with database 103 may continue to use database 103 while the remaining portion of the one or more database files is being migrated in the background from secondary storage system 112 to server 122. Primary system 102 may also perform one or more incremental backup snapshots while the remaining portion of the one or more database files is being migrated in the background from secondary storage system 112 to server 122. The one or more incremental backup snapshots may include data associated with the one or more database files that was not previously backed up. In response to receiving the file system data included in the one or more incremental backup snapshots, secondary storage system 112 is configured to update a tree data structure based on the data included in the one or more incremental backup snapshots. In the event the operator of database 103 agrees to quiesce database 103 and migrate the remaining portion of the one or more database files (e.g., the amount of downtime is not too long), database 103 is quiesced and secondary storage system 112 migrates the remaining portion of the one or more database files to server 122. The operator associated with database 103 and database 123 may decide that the amount of downtime is acceptable.

In some embodiments, the one or more database files stored in storage volume 104 include data that was not included in a backup snapshot. In some embodiments, a last incremental backup snapshot is performed and that data is stored on secondary storage 112 system and included in the data migration. In other embodiments, the data that was not included in a backup snapshot is provided from primary system 102 to server 122.

In other embodiments, database 103 is automatically quiesced and the remaining portion of the one or more database files is migrated from secondary storage system 112 to server 122 in the event the amount of downtime associated with the data migration is less than a downtime threshold (e.g., 1 minute). The downtime threshold may be specified by an operator associated with database 103. Application 133 may receive from secondary storage system 112 the notification that includes the determined amount of time needed to migrate the remaining portion of the one or more database files and in response to the notification, provide to primary system 102 a command to quiesce database 103.

After the data migration of the remaining portion of the one or more database files is completed, the one or more database files that are stored in storage volume 104 may be inconsistent with the one or more database files that are stored in storage volume 124. Secondary storage system 112 may store a copy of the one or more database files that are stored in storage volume 104. Secondary storage system 112 may determine an amount of time needed to migrate the remaining portion of the one or more database files from secondary storage system 112 to server 122. The remaining portion of the one or more database files corresponds to the data needed to make the one or more database files that are stored on primary system 102 consistent with the one or more database files that are stored on server 122.

Secondary storage system 112 may provide to application 133 a notification that includes the determined amount of time needed to migrate the remaining portion of the one or more database files. In some embodiments, in response to receiving the notification, application 133 may provide to an operator associated with database 103 via a user interface an indication of the determined amount of time needed to migrate the remaining portion of the one or more database files. In other embodiments, database 103 is automatically quiesced and the remaining portion of the one or more database files is migrated from secondary storage system 112 to server 122 in the event the amount of downtime associated with the data migrate is less than a downtime threshold (e.g., 1 minute).

The cycle of migrating in the background a remaining portion of one or more database files from secondary storage system 112 to server 122 and determining whether to quiesce the database may continue until the amount of downtime is an acceptable amount of downtime (e.g., less than the downtime threshold).

Figure 1C:
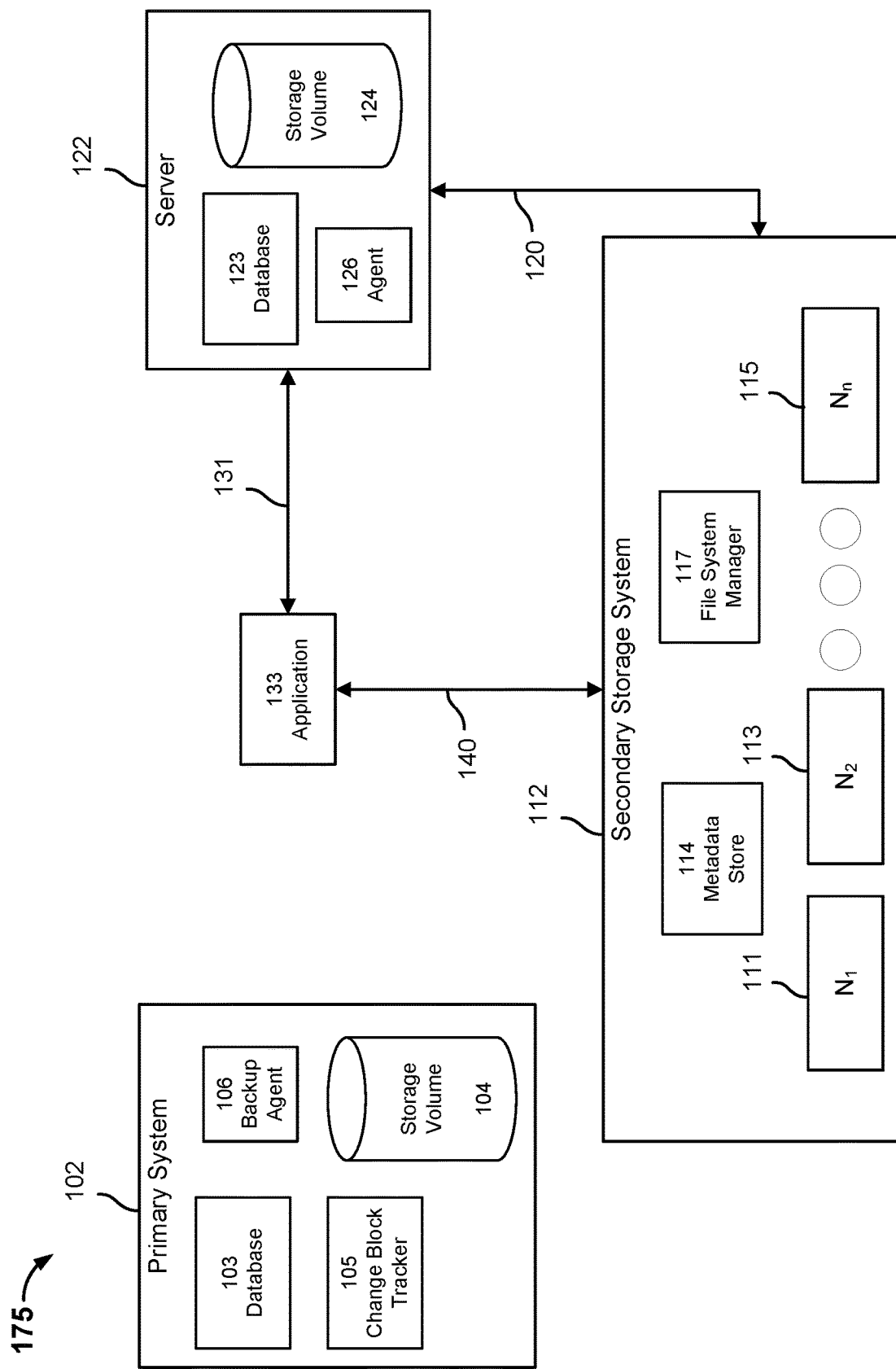
FIG. 1C is a block diagram illustrating an embodiment of a system for migrating database content.

FIG. 1C is a block diagram illustrating an embodiment of a system for migrating database content. In the example shown, system 175 includes primary system 102, secondary storage system 112, server 122, and application 133.

In the example shown, the one or more database file stored in storage volume 104 are consistent with the one or more databases stored in storage volume 124. One or more users associated with database 103 have been reassigned to database 123. An operator associated with database 123 may use application 133 to manage database 123 via network connection 131.

Secondary storage system 112 may cause server 122 to perform a backup snapshot according to a backup snapshot policy and store the backup snapshot to secondary storage system 112. A backup snapshot represents the state of server 122 at a particular point in time (e.g., the state of the file system data). The backup snapshot may include data of the one or more database files. The backup snapshot may be a full backup snapshot or an incremental backup snapshot. A full backup snapshot stores the entire state of the primary system at the particular point in time and includes all of the data associated with the one or more database files. An incremental backup snapshot includes the data associated with the primary system that were not backed up in a previous backup snapshot and may include the data associated with the one or more database files that were not backed up in a previous backup snapshot. Secondary storage system 112 may ingest and store the file system data of the backup snapshot. File system manager 117 may organize the file system data of the backup snapshot using a tree data structure. In some embodiments, file system manager 117 is configured to update an existing tree data structure (e.g., the tree data structure corresponding to the one or more migrated database files) based on the file system data included in the backup snapshot.

Secondary storage system 112 may be configured to provide to application 133 via network connection 140 information associated with secondary storage system 112. In some embodiments, secondary storage system 112 may receive from application 133 via network connection 140 one or more commands to perform secondary storage functions.

Figure 2A:
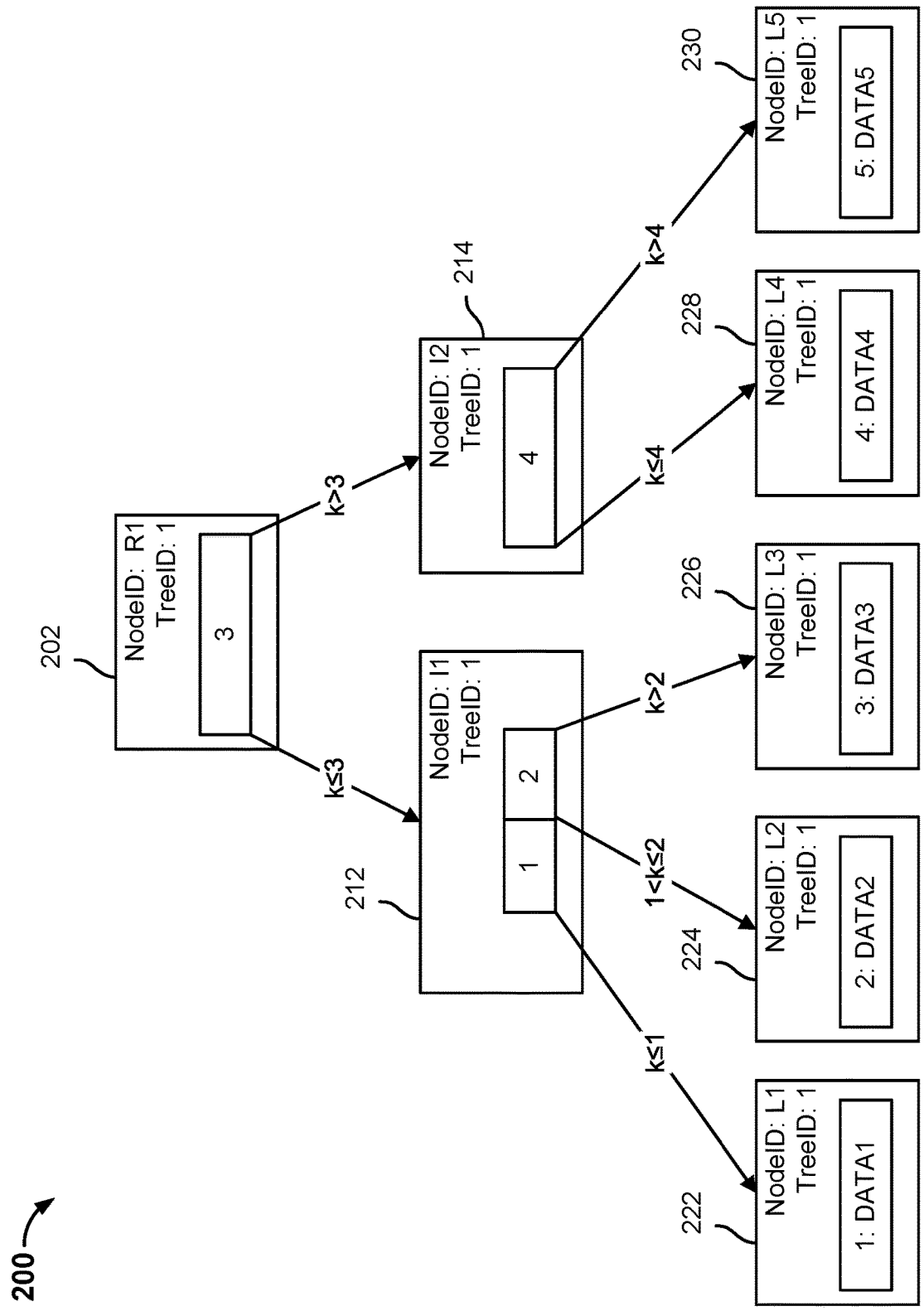
FIG. 2A is a block diagram illustrating an embodiment of a tree data structure.

FIG. 2A is a block diagram illustrating an embodiment of a tree data structure. A tree data structure may be used to represent the file system data that is stored on a secondary storage system, such as secondary storage system 112. The file system data may include metadata for a distributed file system and may include information, such as chunk identifier, chunk offset, file size, directory structure, file permissions, physical storage locations of the files, etc. A file system manager, such as file system manager 117, may generate tree data structure 200.

In the example shown, tree data structure 200 is comprised of a snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time to. The backup snapshot may be received from a primary system, such as primary system 102. The snapshot tree in conjunction with a plurality of file metadata trees may provide a complete view of the primary system associated with the backup snapshot for the particular point in time. The snapshot tree may correspond to a full backup snapshot. A full backup snapshot includes all of the file system data stored on a primary system.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be comprised of one or more data blocks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key.

In other embodiments, a leaf node is configured to store the actual data associated with a file when the file is less than or equal to a limit size. For example, data associated with a file that is less than or equal to 256 kB may reside in the leaf node of a snapshot tree. In some embodiments, a leaf node includes a pointer to a file metadata tree (e.g., blob structure) when the size of the file is larger than the limit size. For example, a leaf node may include a pointer to a file metadata tree corresponding to a database file.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "3." To find a leaf node storing a value associated with a data key of "4" or "5," the second branch of root node 202 would be traversed to intermediate node 214 because data keys "4" and "5" are greater than the node key of "3."

In some embodiments, a hash function may determine which branch of a node with which the non-numerical key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "3." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeD of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata associated with a file. In some embodiments, leaf node 222 is configured to store data associated with a file. In other embodiments, leaf node 222 is configured to store a pointer to a file metadata tree. For example, leaf node 222 may store a pointer to a file metadata tree corresponding to a database file.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata associated with a file. In some embodiments, leaf node 224 is configured to store data associated with a file. In other embodiments, leaf node 224 is configured to store a pointer to a file metadata tree. For example, leaf node 224 may store a pointer to a file metadata tree corresponding to a database file.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata associated with a file. In some embodiments, leaf node 226 is configured to store data associated with a file. In other embodiments, leaf node 226 is configured to store a pointer to a file metadata tree. For example, leaf node 226 may store a pointer to a file metadata tree corresponding to a database file.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228. In some embodiments, leaf node 228 is configured to store metadata associated with a file. In some embodiments, leaf node 228 is configured to store data associated with a file. In other embodiments, leaf node 228 is configured to store a pointer to a file metadata tree. For example, leaf node 228 may store a pointer to a file metadata tree corresponding to a database file.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230. In some embodiments, leaf node 230 is configured to store metadata associated with a file. In some embodiments, leaf node 230 is configured to store data associated with a file. In other embodiments, leaf node 230 is configured to store a pointer to a file metadata tree. For example, leaf node 230 may store a pointer to a file metadata tree corresponding to a database file.

Figure 2B:
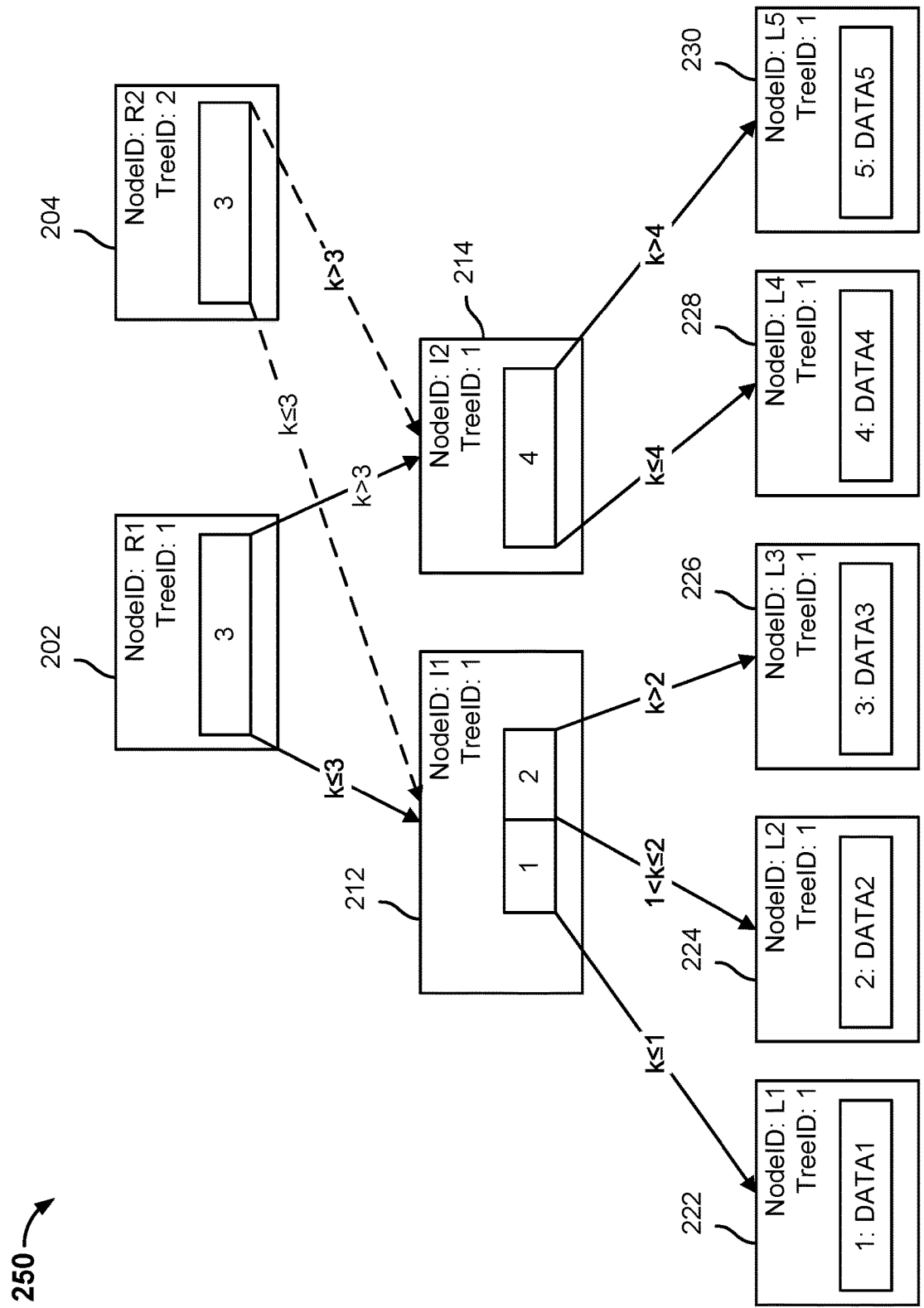
FIG. 2B is a block diagram illustrating an embodiment of a cloned snapshot tree.

FIG. 2B is a block diagram illustrating an embodiment of a cloned snapshot tree. A snapshot tree may be cloned when a snapshot tree is added to a tree data structure. A snapshot tree may be added to the tree data structure when a backup snapshot is received. In some embodiments, tree data structure 250 may be created by a storage system, such as secondary storage system 112. The file system data of a primary system, such as primary system 102, may be backed up to a secondary storage system, such as secondary storage system 112. A subsequent backup snapshot may correspond to a full backup snapshot or an incremental backup snapshot. The manner in which the file system data corresponding to the subsequent backup snapshot is stored in secondary storage system may be represented by a tree data structure. The tree data structure corresponding to the subsequent backup snapshot may be created by cloning a snapshot tree associated with a last backup.

In the example shown, the subsequent backup snapshot corresponds to an incremental backup snapshot. Tree data structure 250 includes root nodes 202, 204, intermediate nodes 212, 214, and leaf nodes 222, 224, 226, 228, and 230. Tree data structure 250 may be a snapshot of file system data at a particular point in time t+n. The tree data structure can be used to capture different versions of file system data at different moments in time. The tree data structure may also efficiently locate desired metadata/data by traversing a particular version of a snapshot tree included in the tree data structure. In some embodiments, the tree data structure allows a chain of backup snapshot versions (i.e., snapshot trees) to be linked together by allowing a node of a later version of a snapshot tree to reference a node of a previous version of a snapshot tree. For example, a snapshot tree with root node 204 is linked to a snapshot tree with root node 202.

Each time a backup snapshot is received, a new root node may be created and the new root node may include the same set of pointers included in the previous root node, that is the new root node of the snapshot may be linked to one or more intermediate nodes associated with a previous snapshot. The new root node also includes a different NodeID and a different TreeID. The TreeID is the view identifier associated with a view of the primary system associated with the backup snapshot for the particular moment in time.

In some embodiments, a root node is associated with a current view of the file system data. A current view may still accept one or more changes to the data. The TreeID of a root node indicates a snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node is associated with a snapshot view of the file system data. A snapshot view may represent a state of the file system data at a particular moment in time in the past and is not updated. In the example shown, root node 202 is associated with a snapshot view of the file system data.

In the example shown, root node 204 is a copy of root node 202. Similar to root node 202, root node 204 includes the same pointers as root node 202. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2" and a TreeID of "2." The NodeID identifies the name of the node. The TreeID identifies the backup snapshot with which the node is associated.

Figure 2C:
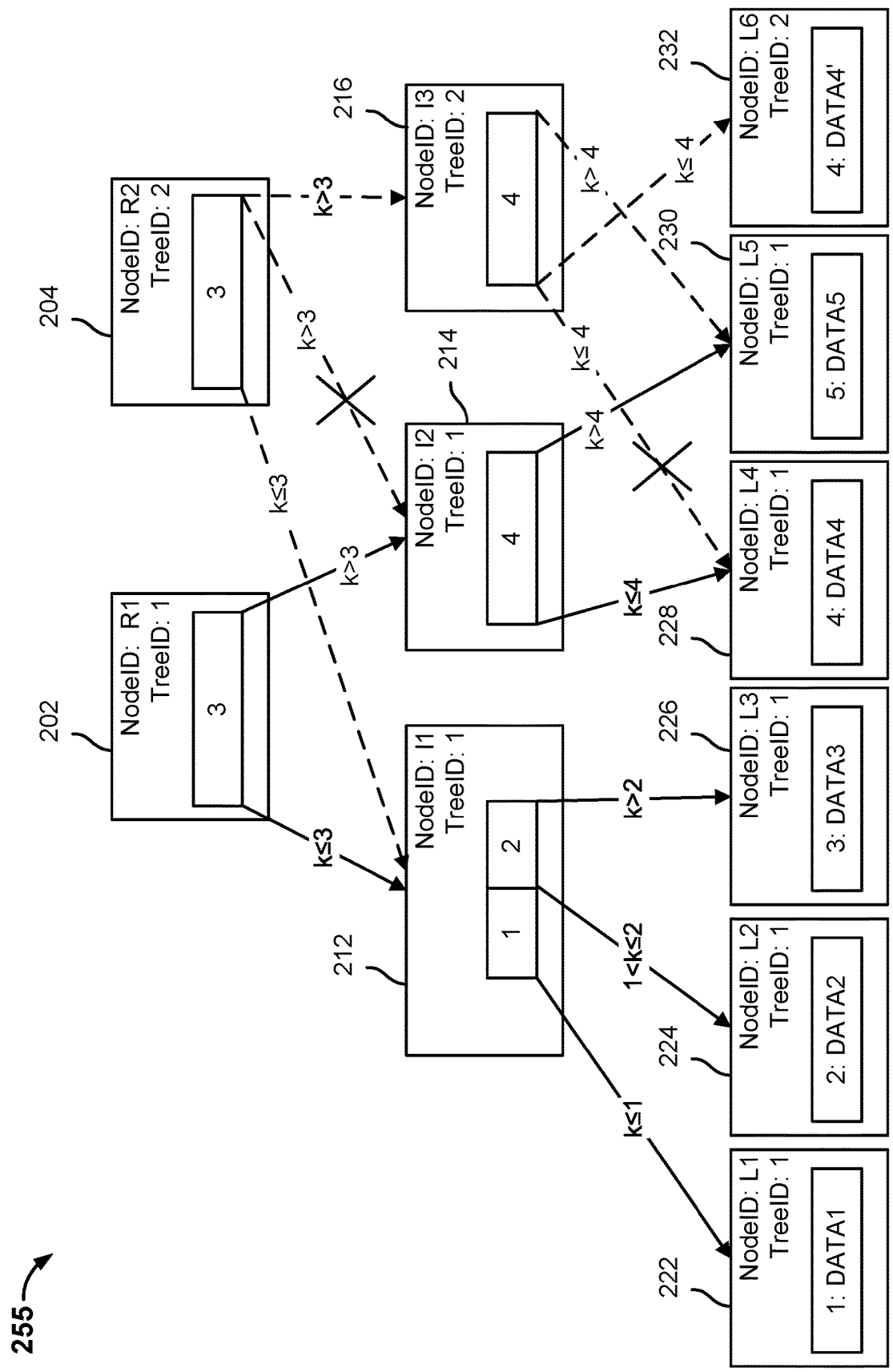
FIG. 2C is a block diagram illustrating an embodiment of modifying a snapshot tree.

FIG. 2C is a block diagram illustrating an embodiment of modifying a snapshot tree. A snapshot tree may be modified based on the data included in a backup snapshot. In the example shown, tree data structure 255 may be modified based on data included in an incremental backup snapshot. Tree data structure 255 may be modified by a file system manager, such as file system manager 115. A snapshot tree with a root node 204 may be a current view of the file system data at time t+n+m, for example, at time $t_2$. A current view represents a state of the file system data that is up-to-date and capable of receiving one or more modifications to the snapshot tree that correspond to modifications to the file system data. Because a snapshot represents a perspective of the file system data that is "frozen" in time, one or more copies of one or more nodes affected by a change to file system data, are made.

In the example shown, the value "DATA4" has been modified to be "DATA4'." In some embodiments, the value of a key value pair has been modified. For example, the value of "DATA4" may be a pointer to a file metadata tree corresponding to a first version of a database file and the value of "DATA4'" may be a pointer to a file metadata tree corresponding to the second version of the database file. In other embodiments, the value of the key pair is the data associated with a content file that is smaller than or equal to a limit size. In other embodiments, the value of the key value pair points to a different file metadata tree. The different file metadata tree may be a modified version of the file metadata tree that the leaf node previously pointed.

At $t_2$, the file system manager starts at root node 204 because that is the root node associated with snapshot tree at time $t_2$ (i.e., the root node associated with the last backup snapshot). The value "DATA4" is associated with the data key "4." The file system manager traverses snapshot tree 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

In some embodiments, leaf node 232 stores the value of a key value pair that has been modified. In other embodiments, leaf node 232 stores the modified data of associated with a file that is smaller than or equal to a limit size. In other embodiments, leaf node 232 stores a pointer to a file metadata tree corresponding to a file, such as a database file.

Figure 2D:
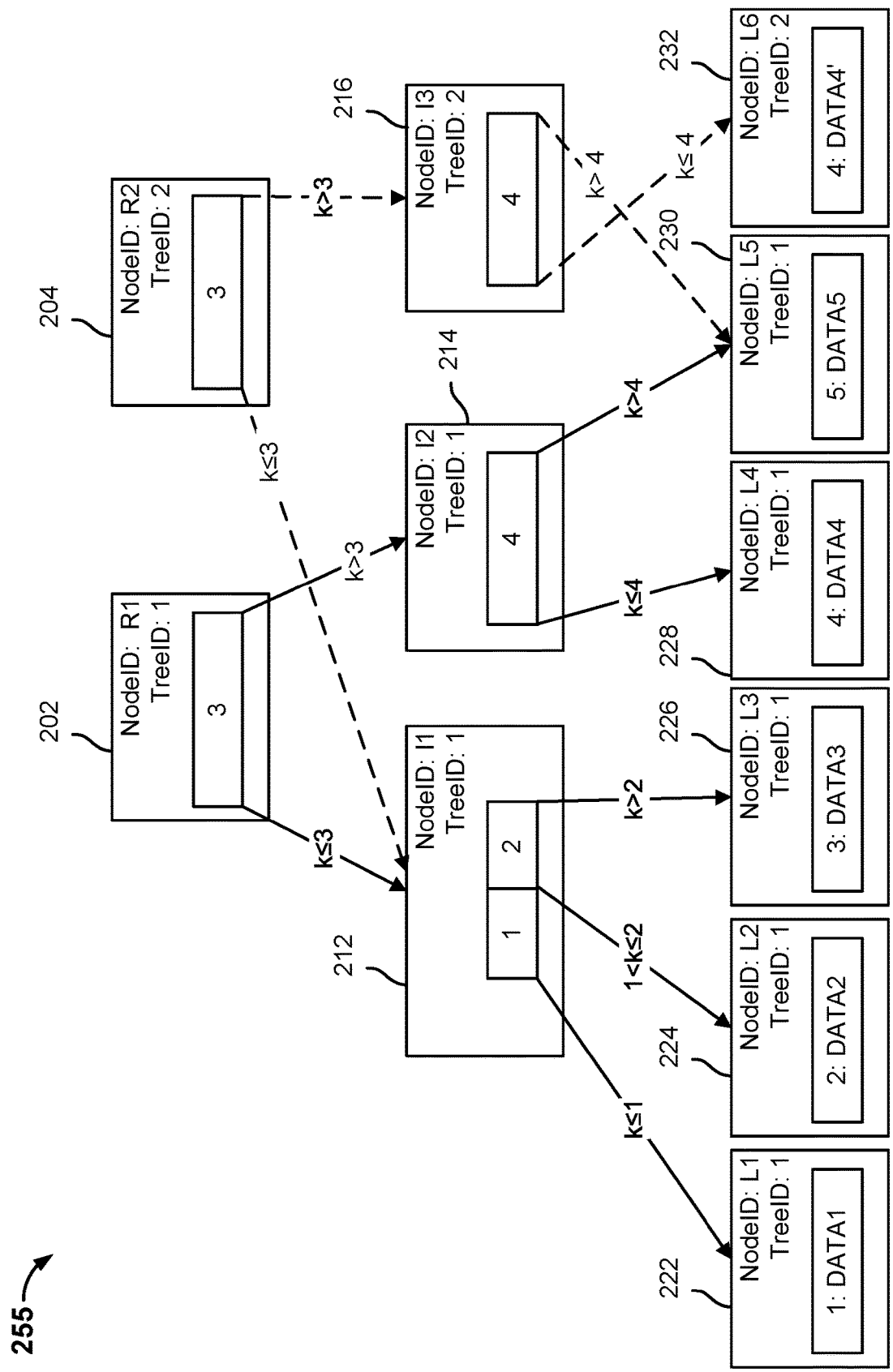
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 3A:
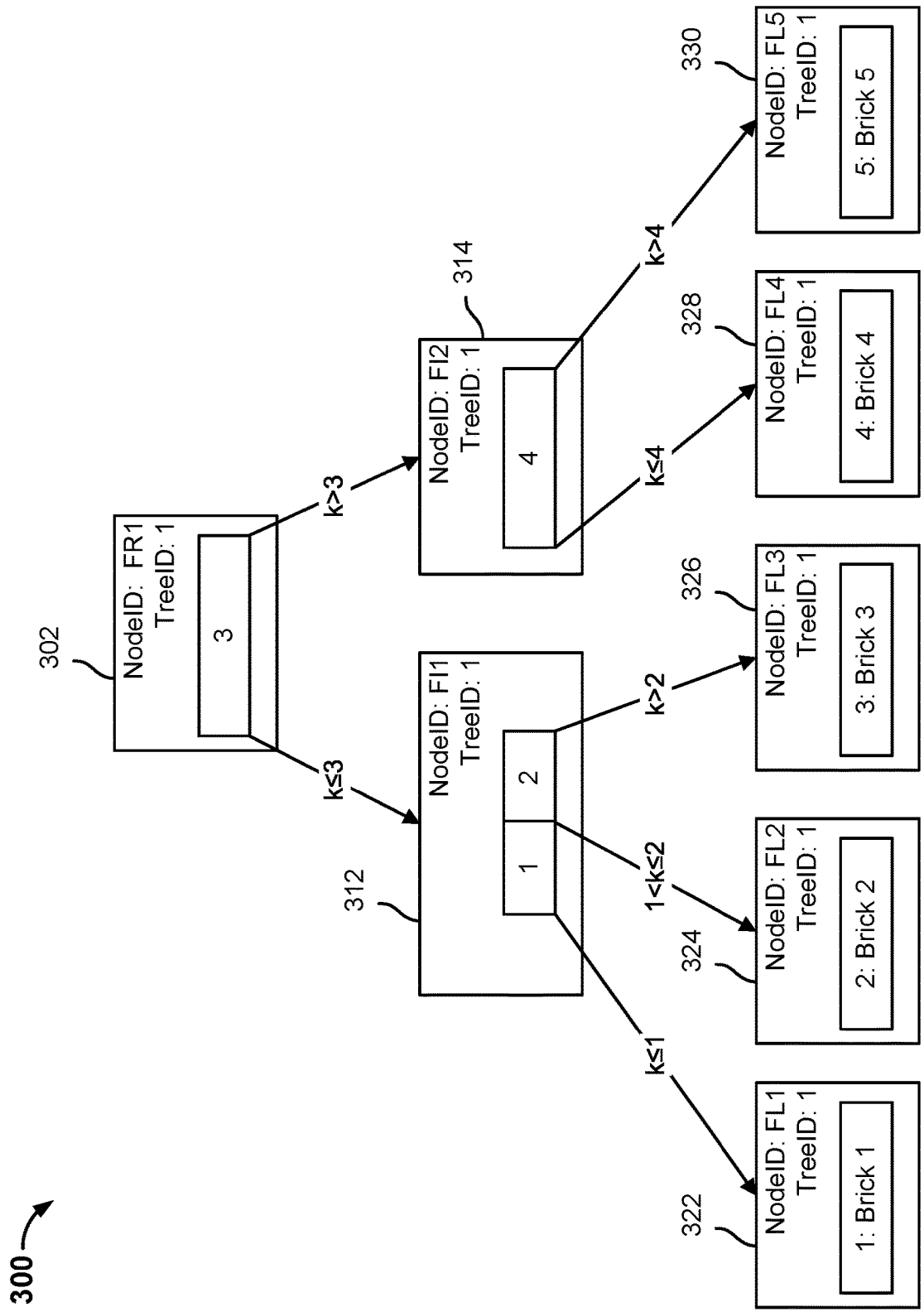
FIG. 3A is a block diagram illustrating an embodiment of a tree data structure.

FIG. 3A is a block diagram illustrating an embodiment of a tree data structure. In some embodiments, tree data structure 300 may be created by a storage system, such as secondary storage system 112. In the example shown, tree data structure 300 corresponds to a file and stores the metadata associated with the file. For example, tree data structure 300 may correspond to a database file and may be used to store the metadata associated with the database file. A leaf node of a snapshot tree associated with file system data, such as a leaf node of tree data structures 200, 250, 255, may include a pointer to a tree data structure corresponding to a file, such as tree data structure 300. A tree data structure corresponding to a file (i.e., a "file metadata tree") is a snapshot tree, but is used to organize the data associated with a file that are stored on the secondary storage system. Tree data structure 300 may be referred to as a "metadata structure" or a "snapshot structure."

A tree data structure corresponding to a content file (e.g., database file) at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time to. A tree data structure associated with file system data may include one or more pointers to one or more tree data structures corresponding to one or more content files.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar of the snapshot trees described above, each node includes a "NodeID" that identifies the node and a "TreeID" that identifies a snapshot/view with which the node is associated.

In the example shown, root node 302 includes a pointer to intermediate node 312 and a pointer to intermediate node 314. Root node 202 includes a NodeID of "FR1" and a TreeID of "1." The NodeID identifies the name of the node. The TreeID identifies the snapshot/view with which the node is associated.

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 will lead to the node with a data key of "1." The pointer to leaf node 324 indicates that traversing tree data structure 300 from intermediate node 312 to leaf node 324 will lead to the node with a data key of "2." The pointer to leaf node 326 indicates that traversing tree data structure 300 from intermediate node 312 to leaf node 326 will lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 will lead to the node with a data key of "4." The pointer to leaf node 330 indicates that traversing tree data structure 300 from intermediate node 314 to leaf node 330 will lead the node with a data key of "5."

Leaf node 322 includes a data key-value pair of "1: Brick 1." "Brick 1" is a brick identifier that identifies the data brick containing one or more data chunks associated with a content file corresponding to tree data structure 300. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" is a brick identifier that identifies the data brick containing one or more data chunks associated with a content file corresponding to tree data structure 300. Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" is a brick identifier that identifies the data brick containing one or more data chunks associated with a content file corresponding to tree data structure 300. Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" is a brick identifier that identifies the data brick containing one or more data chunks associated with a content file corresponding to tree data structure 300. Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" is a brick identifier that identifies the data brick containing one or more data chunks associated with a content file corresponding to tree data structure 300. Leaf node 330 includes NodeID of "FL5" and a TreeID of "1." To view the value associated with a data key of "5," tree data structure 300 is traversed from root node 302 to intermediate node 314 to leaf node 330.

A file, such as a database file, may be comprised of a plurality of data chunks. A brick may store one or more data chunks. In the example shown, leaf nodes 322, 324, 326, 328, 330 each store a corresponding brick identifier. A metadata store may include a data structure that matches a brick identifier with a corresponding location (physical location) of the one or more data chunks comprising the brick. In some embodiments, the data structure matches a brick identifier with a file offset corresponding to data and a database file that corresponds to the file offset. A data brick may include one or more data chunks. The location of the data brick may be identified using a data structure (e.g., list, table, etc.) stored in a metadata store that matches brick identifiers to a physical storage location or the location of the data brick may be identified based on the pointer to the data brick. In some embodiments, the data structure associates brick identifiers with chunk identifiers (e.g., hashes). The data structure or a different data structure may associate chunk identifiers with a brick offset. A chunk may be associated with a chunk table, which contains a corresponding chunk file ID. The chunk file ID is associated with a chunk file table, which indicates the location of the data (e.g., an offset in a data brick).

Figure 3B:
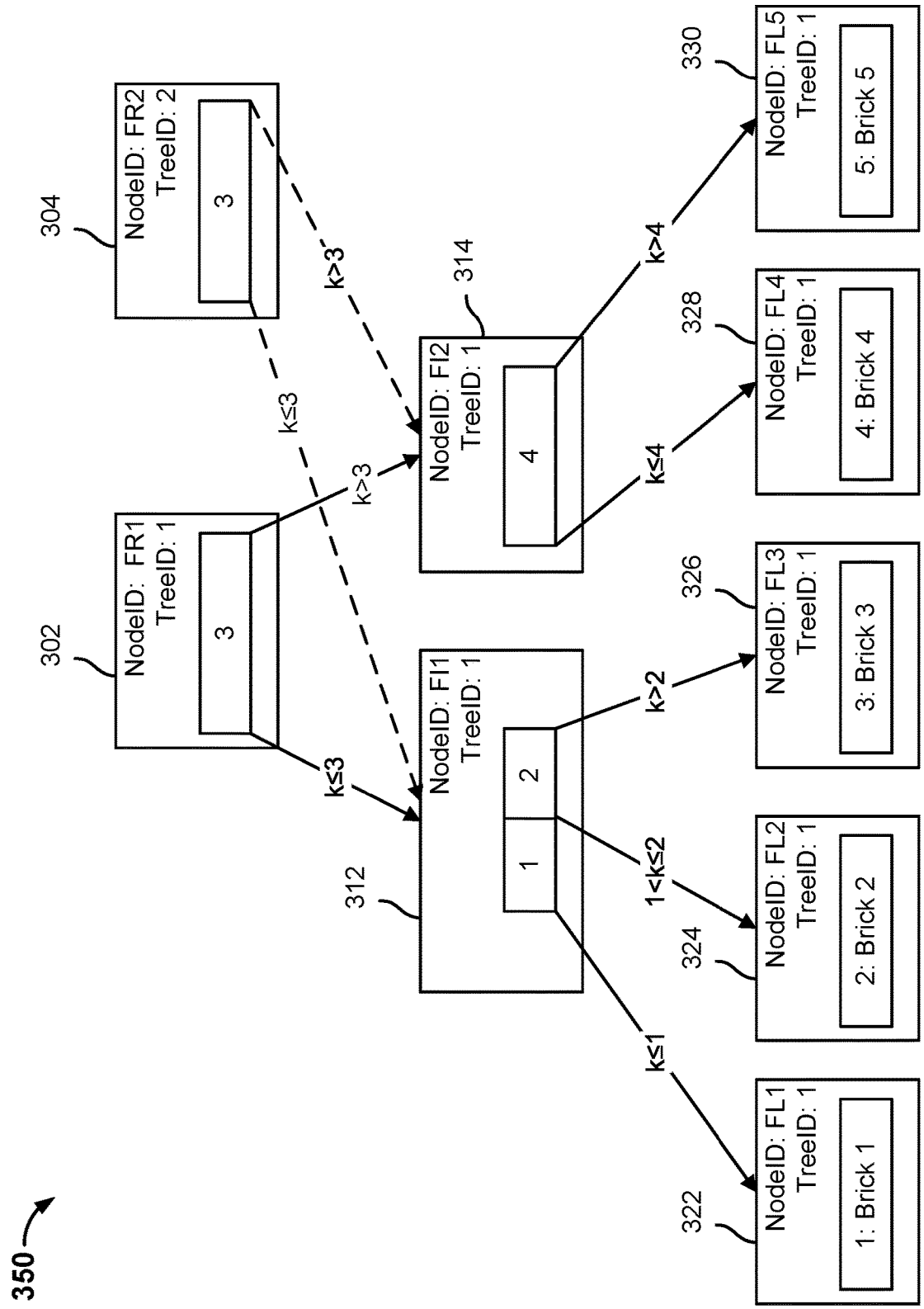
FIG. 3B is a block diagram illustrating an embodiment of a cloned file metadata tree.

FIG. 3B is a block diagram illustrating an embodiment of a cloned file metadata tree. In some embodiments, tree data structure 350 may be created by a storage system, such as secondary storage system 112. A tree data structure corresponding to a file, such as a database file, is a snapshot tree, but stores metadata associated with the file (e.g., the metadata associated with the content file).

The tree data structure corresponding to a file can be used to capture different versions of the file at different moments in time. In some embodiments, the tree data structure allows a chain of file metadata trees corresponding to different versions of a file to be linked together by allowing a node of a later version of a file metadata tree to reference a node of a previous version of a file metadata tree. A file metadata tree is comprised of a root node, one or more levels of one or more intermediate nodes, and one or more leaf nodes.

A root node or an intermediate node of a version of a file metadata tree may reference an intermediate node or a leaf node of a previous version of a file metadata tree. Similar to the snapshot tree structure, the file metadata tree structure allows different versions of file data to share nodes and allows changes to a content file to be tracked. When a backup snapshot is received, a root node of the file metadata tree may be linked to one or more intermediate nodes associated with a previous file metadata tree. This may occur when the file is included in both backup snapshots.

In the example shown, tree data structure 350 includes a first file metadata tree comprising root node 302, intermediate nodes 312, 314, and leaf nodes 322, 324, 326, 328, and 330. Tree data structure 350 also includes a second file metadata tree that may be a snapshot of file data at a particular point in time t+n, for example at time $t_1$. The second file metadata tree is comprised of root node 304, intermediate nodes 312, 314, and leaf nodes 322, 324, 326, 328, and 330. The first file metadata tree may correspond to a first version of a database file and the second file metadata tree may correspond to a second version of the database file.

To create a snapshot of the file data at time t+n, a new root node is created. The new root node is a clone of a previous root node and includes the same set of pointers as the previous root node. In the example shown, root node 304 includes a set of pointers to intermediate nodes 312, 314, which are intermediate nodes associated with a previous snapshot. The new root node also includes a different NodeID and a different TreeID. The TreeID is the view identifier associated with a view of the file metadata tree at a particular moment in time. In some embodiments, root node 304 is associated with a current view of the file data. The current view may represent a state of the file data that is up-to-date and is capable of receiving one or more modifications to the file metadata tree that correspond to modifications to the file data.

The TreeID of a root node indicates a snapshot with which the root node is associated. For example, root node 302 with a TreeID of "1" is associated with a first backup snapshot and root node 304 with a TreeID of "2" is associated with a second backup snapshot. In other embodiments, root node 304 is associated with a snapshot view of the file data. A snapshot view may represent a state of the file data at a particular moment in time in the past and is not updated.

In the example shown, root node 304 is a copy of root node 302. Similar to root node 302, root node 304 includes the same pointers as root node 302. Root node 304 includes a first set of pointers to intermediate node 312. The first set of pointers associated with a data key (e.g., "1," "2," or "3") less than or equal the node key indicates that traversing a file metadata tree included in tree data structure 350 from root node 304 to intermediate node 312 will lead to a leaf node with a data key of "1," "2," or "3." Root node 304 includes a second set of pointers to intermediate node 314. The second set of pointers associated with a data key greater than the node key indicates that traversing a file metadata tree included in tree data structure 350 from root node 304 to intermediate node 314 will lead to a leaf node with a data key of "4" or "5." Root node 304 includes a NodeID of "FR2" and a TreeID of "2." The NodeID identifies the name of the node. The TreeID identifies the backup snapshot with which the node is associated.

Figure 3C:
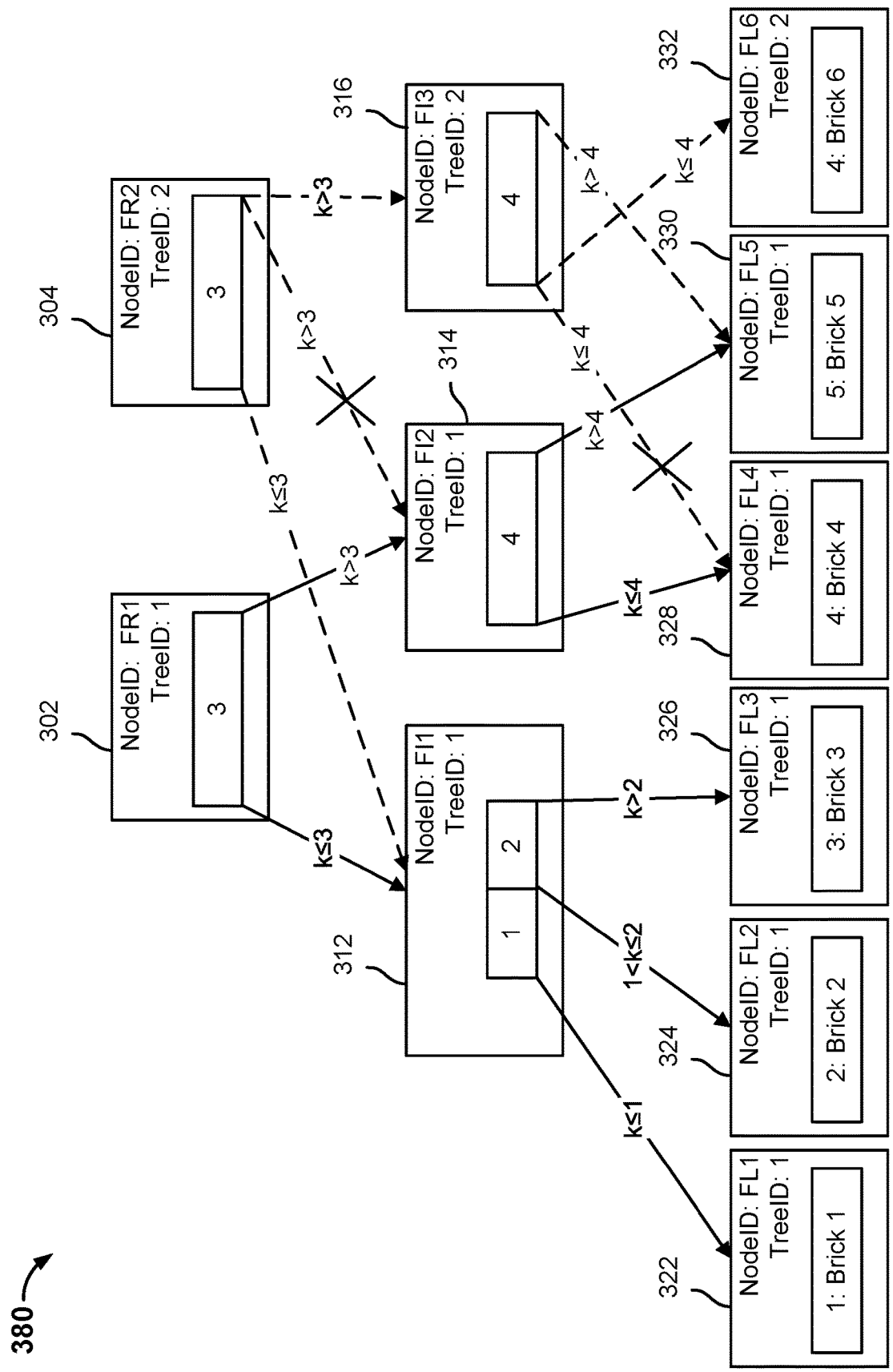
FIG. 3C is a block diagram illustrating an embodiment of modifying a file metadata tree of a tree data structure.

FIG. 3C is a block diagram illustrating an embodiment of modifying a file metadata tree of a tree data structure. In the example shown, tree data structure 380 may be modified based on data included in an incremental backup snapshot. Tree data structure 380 may be modified by a file system manager, such as file system manager 115. A file metadata tree with root node 304 may be a current view of the file data at time t+n+m, for example, at time $t_2$. A current view may represent a state of the file data that is up-to-date and capable of receiving one or more modifications to the file metadata tree that correspond to modifications to the file system data. Because a snapshot represents a perspective of the file data that is "frozen" in time, one or more copies of one or more nodes affected by a change to file data, are made.

In some embodiments, the file data may be modified such that one of the data chunks is replaced by another data chunk. When a data chunk of file data associated with a previous backup snapshot is replaced with a new data chunk, the data brick storing the data chunk may be different. A leaf node of a file metadata tree stores a brick identifier associated with a particular brick containing the data chunk. To represent this modification to the file data, a corresponding modification is made to a current view of a file metadata tree. The current view of the file metadata tree is modified because the previous file metadata tree is a snapshot view and can no longer be modified. The data chunk of the file data that was replaced has a corresponding leaf node in the previous file metadata tree. A new leaf node in the current view of the file metadata tree is created, as described herein, that corresponds to the new data chunk. The new leaf node includes an identifier associated with the current view. The new leaf node may also store the chunk identifier associated with the modified data chunk.

In the example shown, a data chunk included in "Brick 4" has been modified. The data chunk included in "Brick 4" has been replaced with a data chunk included in "Brick 6." At $t_2$, the file system manager starts at root node 304 because that is the root node associated with the file metadata tree at time $t_2$. The value "Brick 4" is associated with the data key "4." The file system manager traverses tree data structure 380 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 380 from intermediate node 316 to leaf node 328, determines that the TreeID of leaf node 328 does not match the TreeID of root node 304, and creates a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

Figure 3D:
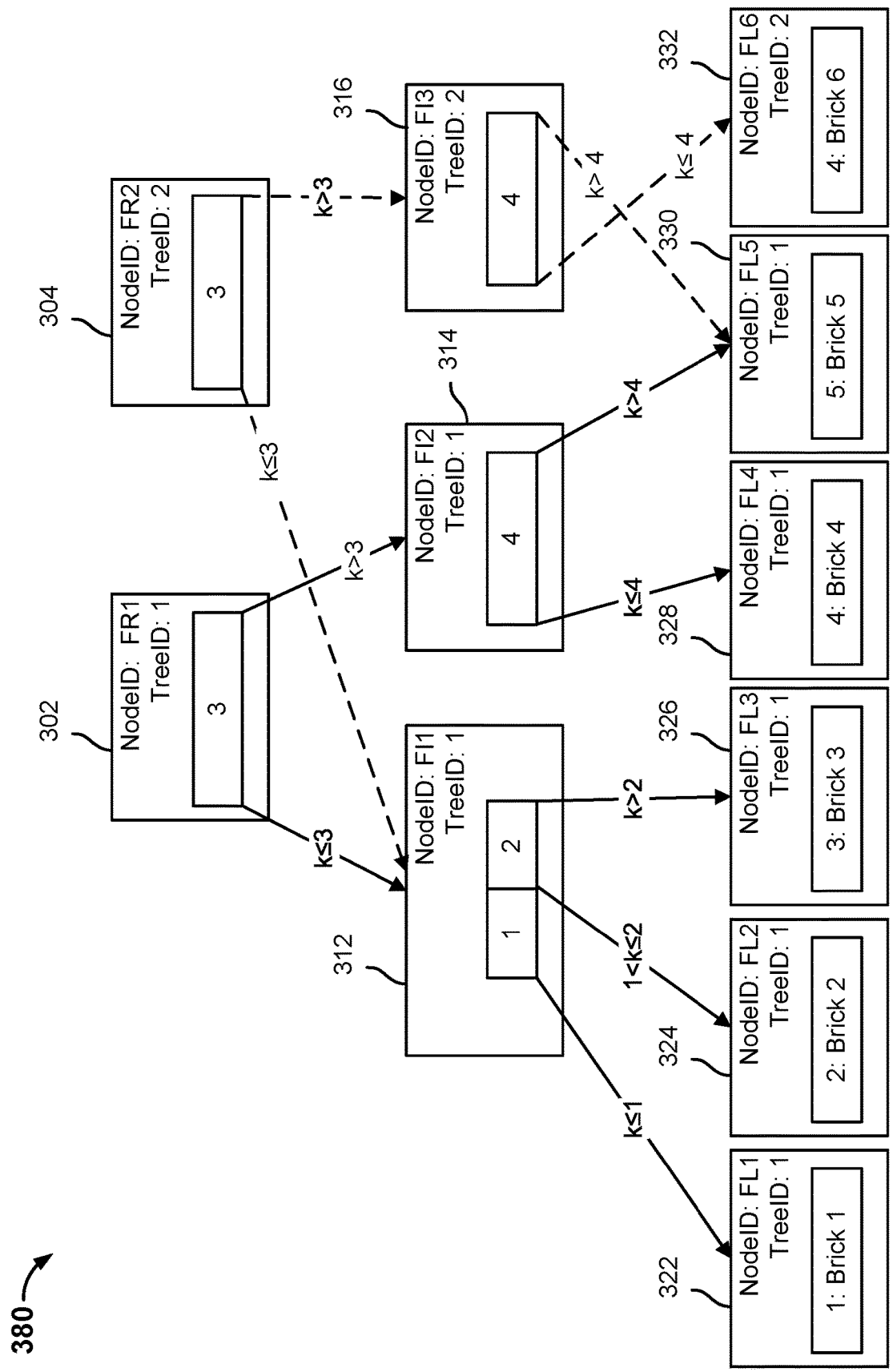
FIG. 3D is a block diagram illustrating an embodiment of a modified file metadata tree.

FIG. 3D is a block diagram illustrating an embodiment of a modified file metadata tree. The file metadata tree 380 shown in FIG. 3D illustrates a result of the modifications made to file metadata tree 380 as described with respect to FIG. 3C.

Figure 4A:
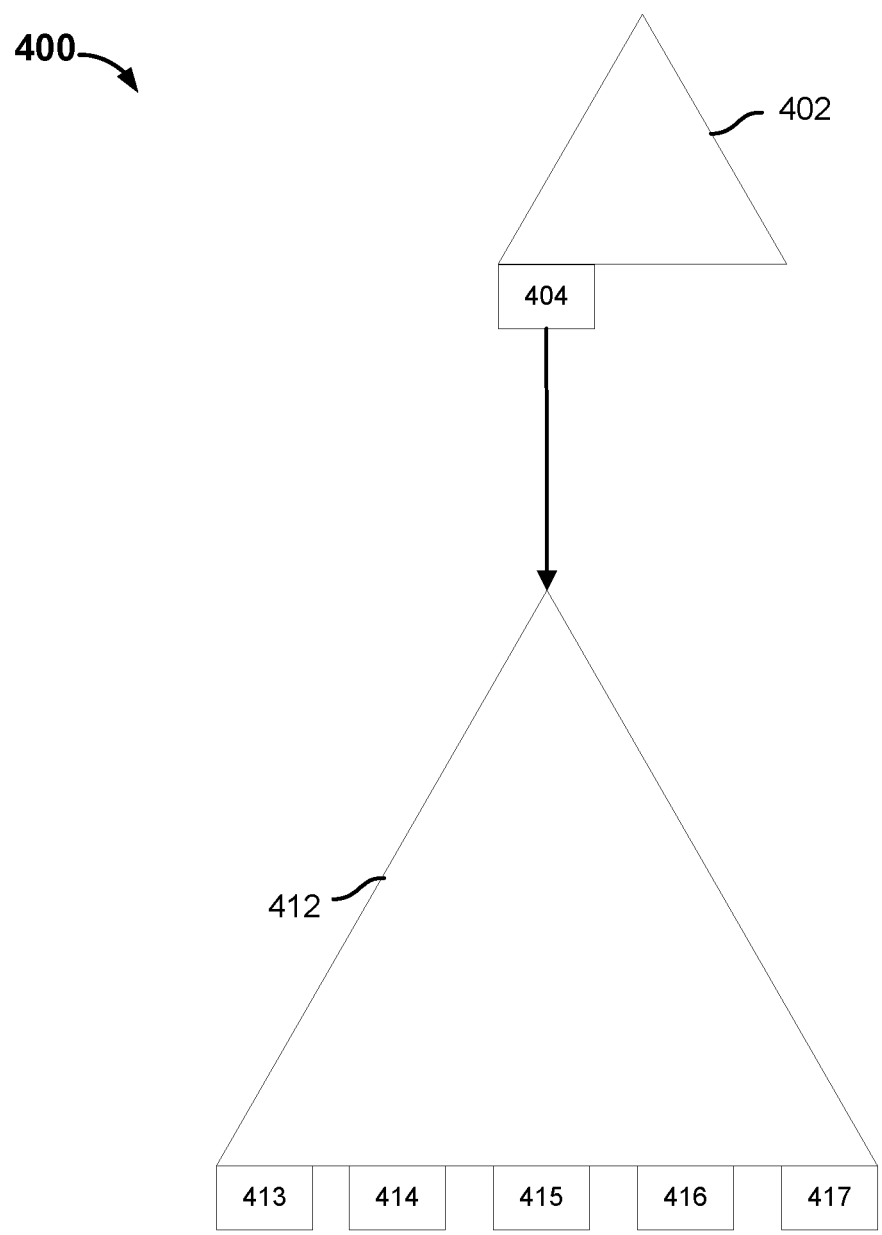
FIG. 4A is a diagram illustrating an embodiment of a view of file system data.

FIG. 4A is a diagram illustrating an embodiment of a view of file system data. In the example shown, file system data view 400 may be generated by a file system manager, such as file system manager 117.

File system data view 400 may correspond to a first backup snapshot of file system data. File system data view 400 includes a snapshot tree 402 and file metadata tree 412. Snapshot tree 402 includes leaf node 404. Leaf node 404 includes a pointer to a root node of file metadata tree 412. Snapshot tree 402 may include other leaf nodes that are not shown for explanation purposes. The other leaf nodes may include pointers to other corresponding file metadata trees.

File metadata tree 412 is configured to store the metadata associated with a first version of a content file. The content file may correspond to a database file. File metadata tree includes leaf nodes 413, 414, 415, 416, 417. Each leaf node has a corresponding identifier of a data brick containing one or more data chunks of the content file or a corresponding pointer to the data brick containing the one or more data chunks of the content file.

Figure 4B:
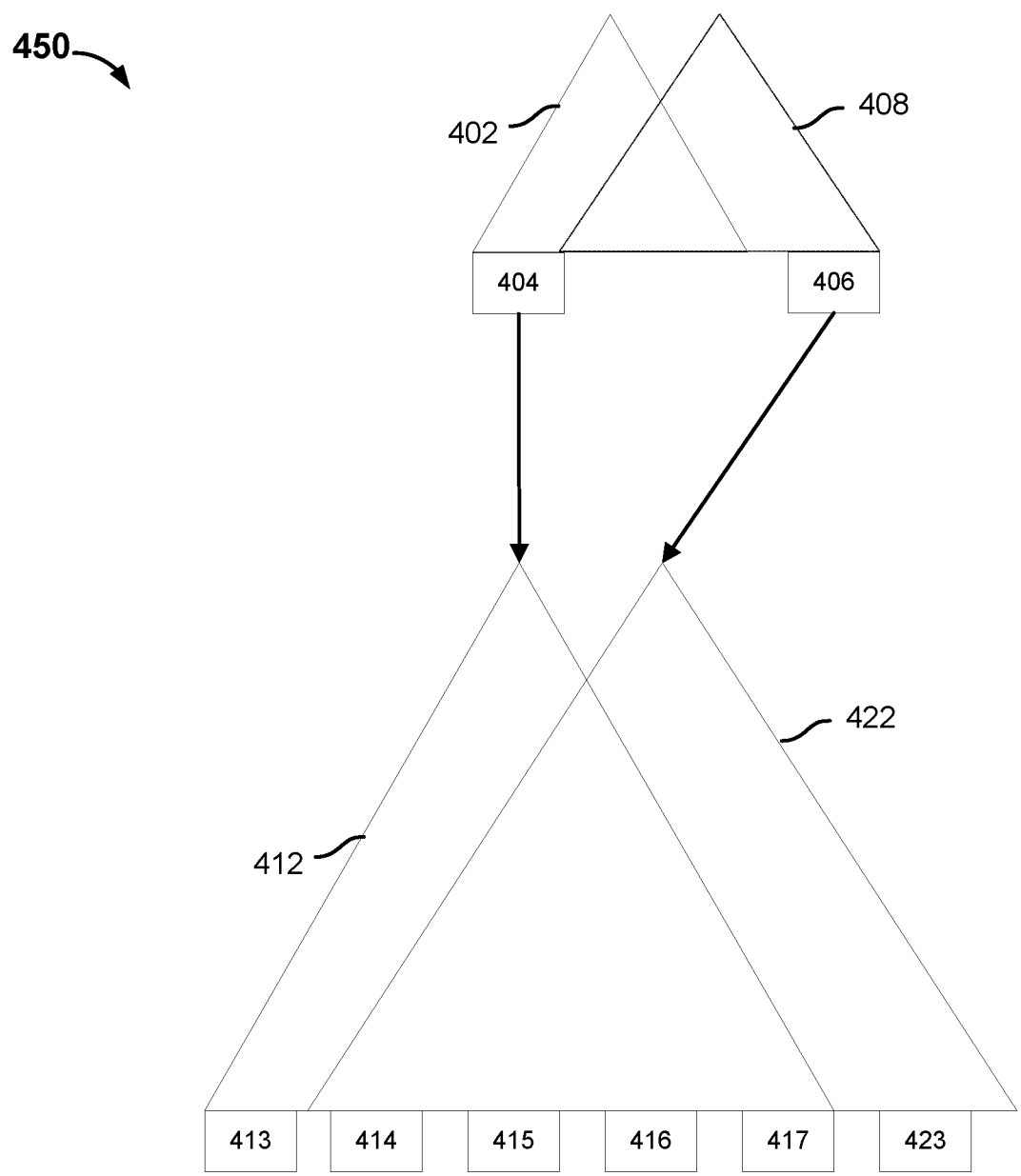
FIG. 4B is a diagram illustrating an embodiment of a view of file system data.

FIG. 4B is a diagram illustrating an embodiment of a view of file system data. In the example shown, file system data view 450 may be generated by a file system manager, such as file system manager 115.

In the example shown, file system data view 450 may correspond to a second backup snapshot (e.g., an incremental backup snapshot) of file system data. File system data view 400 is illustrated next to file system data view 450. File system data view 450 includes a snapshot tree 408 and file metadata tree 422. Snapshot tree 408 includes one or more nodes that are shared with snapshot tree 402. Snapshot tree 408 includes leaf node 406, which is a leaf node not shared with snapshot tree 402. Leaf node 406 includes a pointer to a root node of file metadata tree 422. Snapshot tree 408 may include other leaf nodes that are not shown for explanation purposes. The other leaf nodes may include pointers to other corresponding file metadata trees.

File metadata tree 422 is configured to store the metadata associated with a second version of the content file. For example, file metadata tree 422 may be configured to store the metadata associated with a second version of a database file. File metadata tree 422 includes leaf nodes 414, 415, 416, 417, 423. Some of the data associated with the content file corresponding to file metadata tree 422 has not changed since the last backup snapshot. In this example, the data associated with leaf nodes 414, 415, 416, 417 has not changed since the first backup snapshot. The data associated with leaf node 423 has been added in the second version of the content file.

Leaf node 423 is associated with data that was not included in the first backup snapshot of file system data. Leaf node 423 may be determined to be associated with the second backup snapshot by traversing the snapshot tree associated with the second backup snapshot. Snapshot tree 408 is the snapshot tree associated with the second backup snapshot. Snapshot tree 408 may be traversed to leaf node 406, which includes a pointer to the root node of file metadata tree 422. File metadata tree 422 may be traversed to each of the leaf nodes. Each leaf node of file metadata tree 422 has an associated view identifier. In the event the view identifier associated with a leaf node matches the view identifier associated with the root node of the file metadata tree, the data associated with the leaf node is determined to be associated with the second backup snapshot, that is, the data was added to the primary system since the first backup snapshot. In some embodiments, the file corresponding to file metadata tree 422 has been modified to include one or more data chunks associated with leaf node 423 instead of the one or more data chunks associated with leaf node 413.

The size of the data associated with leaf node 423 is the amount of data that has changed since a first backup snapshot. A secondary storage system may determine the amount of time needed to migrate to a database server the data associated with leaf node 423. In some embodiments, the determined amount of time may be greater than or equal to a downtime threshold (e.g., 1 minute). In other embodiments, the determined amount of time is less than the downtime threshold.

Figure 5:
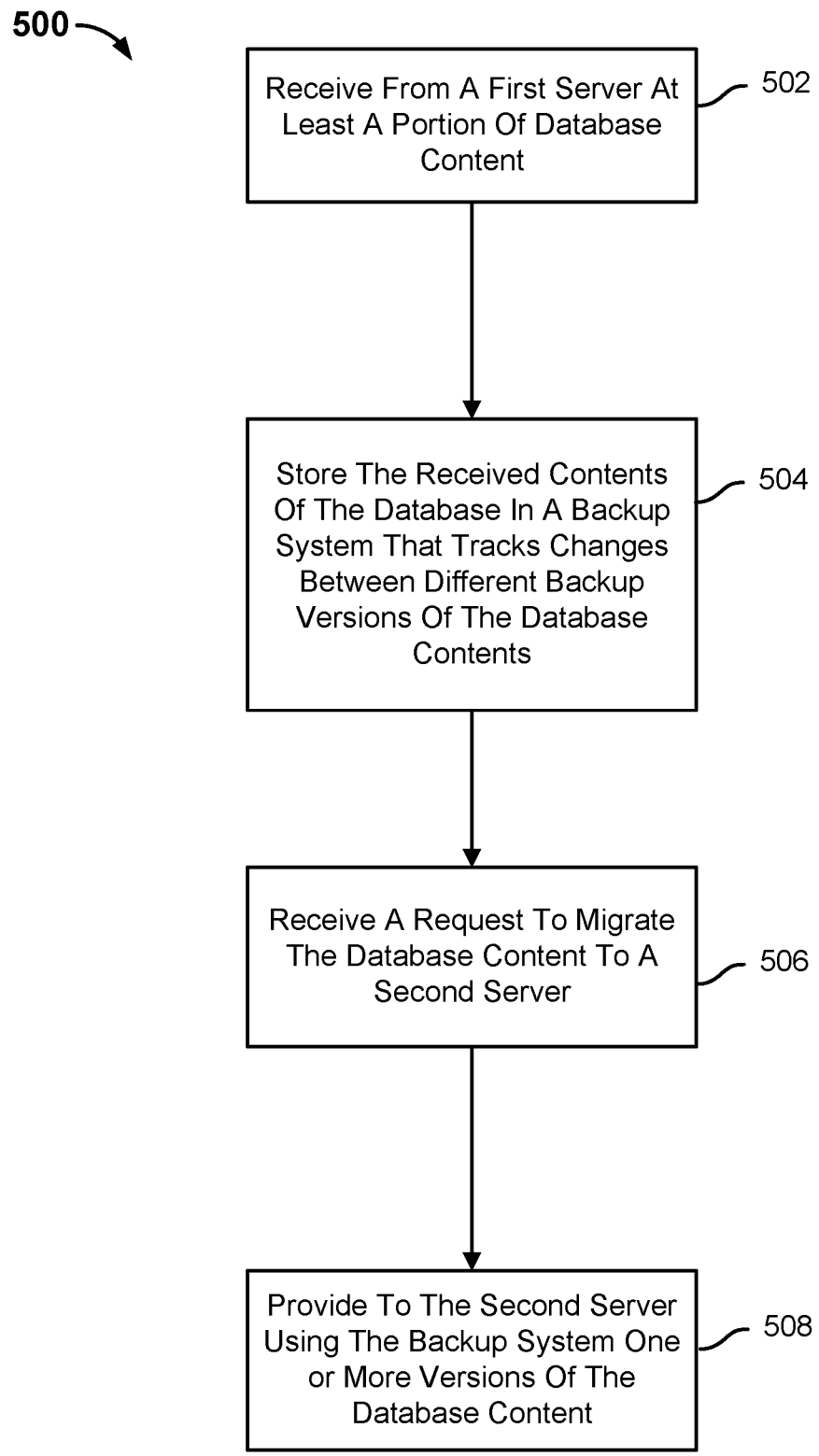
FIG. 5 is a flow chart illustrating a process for migrating database content in accordance with some embodiments.

FIG. 5 is a flow chart illustrating a process for migrating database content in accordance with some embodiments. In the example shown, process 500 may be implemented by a storage system, such as secondary storage system 112.

At 502, at least a portion of contents of a database are received from a first server. A first server may act as a primary system and include a database. The primary system may store data associated with the database in one or more database files. The one or more database files may include a primary database file and a log file. A storage system, such as a secondary storage system, may cause the primary system to perform a backup snapshot according to a backup snapshot policy and store the backup snapshot to the secondary storage system.

A backup snapshot represents the state of the primary system at a particular point in time (e.g., the state of the file system data). The backup snapshot may include data of the one or more database files. The backup snapshot may be a full backup snapshot or an incremental backup snapshot. A full backup snapshot stores the entire state of the primary system at the particular point in time and includes all of the contents associated with a database (e.g., all of the one or more database files). An incremental backup snapshot includes the data associated with the primary system that was not backed up in a previous backup snapshot and may include a portion of the database contents (e.g., the data associated with the one or more database files) that were not backed up in a previous backup snapshot.

At 504, the received contents of the database are stored in a backup system that tracks changes between different backup versions of the database contents. A secondary storage system may ingest and store the file system data of the backup snapshot. A file system manager of the secondary storage system may organize the file system data of the backup snapshot using a tree data structure. The tree data structure provides a view of the file system data corresponding to a backup snapshot. The view of the file system data corresponding to the backup snapshot is comprised of a file system metadata snapshot tree and one or more file metadata trees.

A file system metadata snapshot tree is a representation of a fully hydrated backup because it provides a complete view of the primary system at a particular moment in time. A fully hydrated backup is a backup that is ready for use without having to reconstruct a plurality of backups to use it. Conventional systems may reconstruct a backup by starting with a full backup and applying one or more changes associated with one or more incremental backups to the data associated with the full backup. In contrast, any file stored on the primary system at a particular time and the file's contents, for which there is an associated backup snapshot, may be determined from the file system metadata snapshot tree, regardless if the associated backup snapshot was a full backup snapshot or an incremental backup snapshot. Creating an incremental backup snapshot of a primary system may include only copying data of the primary system that was not previously backed up. However, a file system metadata snapshot tree corresponding to an incremental backup snapshot provides a complete view of the primary system at the particular moment in time because it includes references to data of the primary system that was previously stored. For example, a root node associated with the file system metadata snapshot tree may include one or more references to nodes associated with one or more previous backup snapshots and one or more references to nodes associated with the current backup snapshot. This provides significant savings in the amount of time needed to restore, recover, or replicate a database file. In contrast, traditional recovery/restoration methods may require significant time, storage, and computational resources to reconstruct a particular version of a database file from a full backup and a series of incremental backups.

A file metadata tree is a snapshot structure that stores the metadata associated with a file and may correspond to one of the files included in the backup snapshot. For example, a file metadata tree may correspond to one of the database files. The file metadata tree can be used to capture different versions of the file (e.g., different versions of a database file) at different moments in time. In some embodiments, the tree data structure allows a chain of file metadata trees corresponding to different versions of a file to be linked together by allowing a node of a later version of a file metadata tree to reference a node of a previous version of a file metadata tree.

A file metadata tree is comprised of a root node, one or more levels of one or more intermediate nodes, and one or more leaf nodes. A root node or an intermediate node of a version of a file metadata tree may reference an intermediate node or a leaf node of a previous version of a file metadata tree. The file metadata tree structure may allow different versions of a file to share nodes and allows changes to the file to be tracked. When a backup snapshot is received, a root node of the file metadata tree may be linked to one or more intermediate nodes associated with a previous file metadata tree. This may occur when data associated with the file is included in both backup snapshots.

At 506, a request to migrate contents of the database to a second server is received. An operator associated with a database running on the first server may desire to use an upgraded version of the database hosted on a second server. The database content associated with the database (e.g., one or more database files) may migrated from the secondary storage system to a second server hosting the upgraded version of the database. The secondary storage system may store a copy of the database content stored on the first server. The secondary storage system may be used to migrate the database content instead of the first server to free up system resources of the first server for other purposes, such as to respond to one or more database requests.

The database content may be quite large (e.g., 10 TB). It may take a long period of time (e.g., 10 hours) for the database content to be migrated from the secondary storage system to the second server hosting the upgraded version of the database. One conventional solution is to quiesce the database and migrate the database content. The database may be quiesced to ensure that the database content stored on the first server is consistent with database content stored on the second server. However, the database on the first server may receive tens, hundreds, even thousands of database requests (e.g., reads/writes) per second from a plurality of users. The number of unfulfilled database requests increases each second that the database is offline. Such a conventional solution may result in an unacceptable amount of downtime for the database.

In some embodiments, a rate at which backup snapshots are performed in response to the request to migrate contents of the database to the second server. A backup policy may indicate that a rate associated with incremental backup snapshots increases from a first incremental backup snapshot rate to a second incremental backup snapshot rate in response to the request to migrate contents of the database to the second server. For example, the backup policy may indicate that a rate at which a first server performs an incremental backup snapshot increases from every hour to every ten minutes.

At 508, one or more versions of the database content is provided to the second server using the backup system. An initial version of the database contents stored at a secondary storage system may be provided from the secondary storage system to the second server. The initial version may correspond to a latest version of the database contents. The latest version of the database contents may be determined by the secondary storage system. The secondary storage system may traverse a tree data structure associated with the latest version of the database content and locate the data associated with the latest version of the database contents. A complete copy of the data associated with the latest version of the database content may be provided from the secondary storage system to the second server hosting the upgraded version of the database.

One or more users associated with the database hosted on the first server may continue to use the database (i.e., the first database version) while the data associated with the latest version of the database content is being migrated in the background from the secondary storage system to the second server hosting the upgraded database.

After the data is migrated, the database content stored on the first server may be inconsistent with the database content stored on the second server because the one or more users associated with the database hosted on the first server may have made one or more changes to the database content stored on the first server. The secondary storage system may store a remaining portion of the database content that represents the portion of the database content needed to make the database content stored on the first server consistent with the database content stored on the second server. The secondary storage system may determine an amount of time to migrate from the secondary storage system to the second server the remaining portion of the database content.

In some embodiments, the amount of time is less than a downtime threshold. In response to the amount of time being less than the downtime threshold, the database on the first server may be quiesced and the remaining portion of the database content is migrated from the secondary storage system to the second server.

In other embodiments, the amount of time is not less than a downtime threshold. The remaining portion of the database content may be migrated in the background from the secondary storage system to the second server and one or more users associated with the database hosted on the first server may continue to use the database. Each time a data migration is completed, the secondary storage system may determine a corresponding amount of time to migrate from the secondary storage system to the second server the remaining portion of the database content. Until the amount of time to migrate a remaining portion of the database content is less than the downtime threshold, the remaining portion may continue to be migrated in the background from the secondary storage system to the second server while one or more users associated with the database continue to use the database. Each time a corresponding remaining portion of the database content is migrated from the secondary storage system to the second server, the amount of time to migrate a subsequent remaining portion of the database content decreases. After one or more data migrations, the amount of time to migrate a remaining portion of the database content will be less than the downtime threshold, the database on the first server is quiesced, and the remaining portion of the database content is migrated from the secondary storage system to the second server.

The process of migrating database content in the background, determining an amount of time to migrate a remaining portion of the database content, and determining whether to quiesce the database based on the determined amount of time not only reduces the amount of downtime associated with the database, but also ensures that the database content stored on the primary system and the database content stored on the second server hosting the upgraded version of the database are in sync with each other before the one or more users associated with the database are reassigned to the upgraded version of the database.

Figure 6:
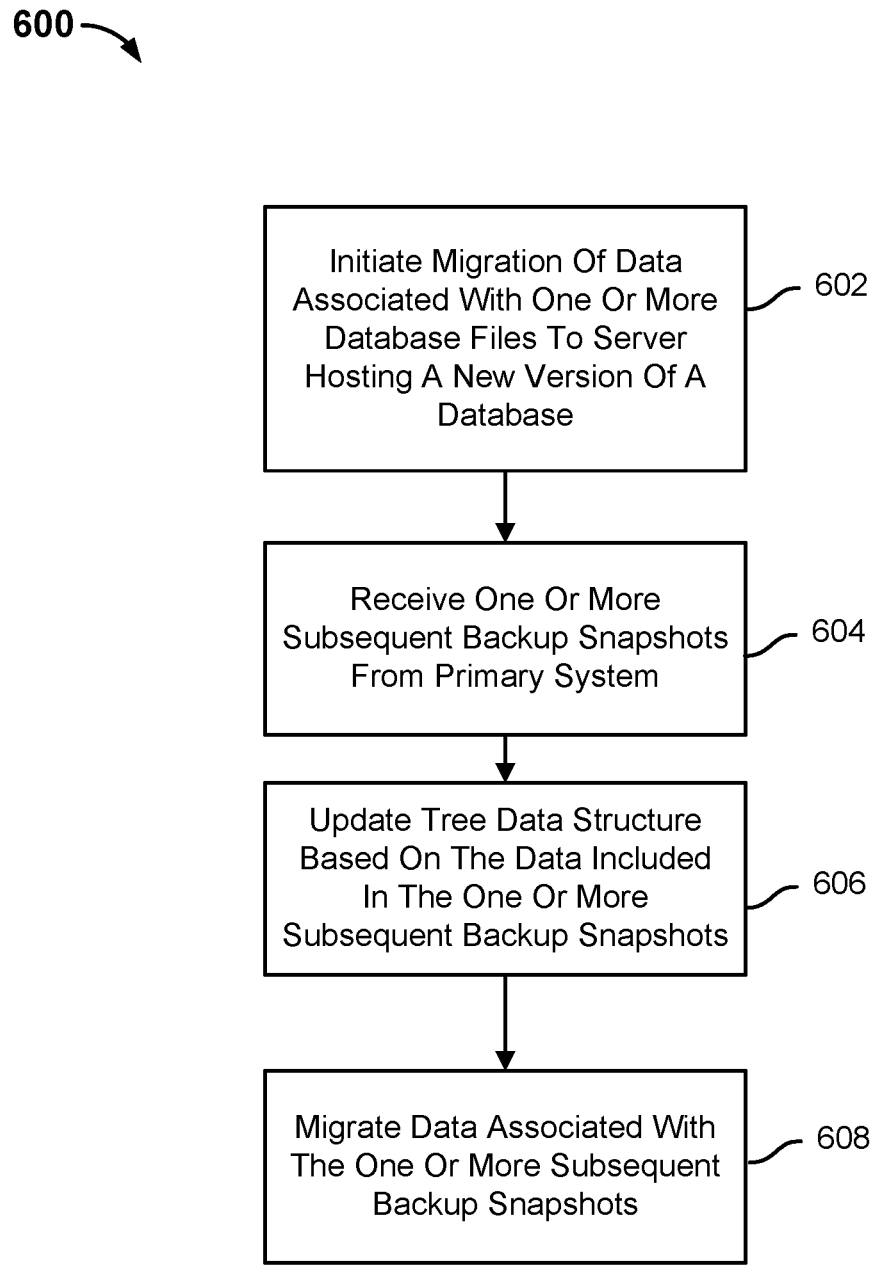
FIG. 6 is a flow chart illustrating a process for migrating database content in accordance with some embodiments.

FIG. 6 is a flow chart illustrating a process for migrating database content in accordance with some embodiments. In the example shown, process 600 may be implemented by a storage system, such as secondary storage system 112. In some embodiments, process 600 may be implemented to perform some or all of step 508 of process 500.

At 602, a migration of data associated with one or more database files to a server hosting an upgraded version of a database is initiated. The data associated with the one or more database files may be backed up from a primary system to a secondary storage system. The data associated with the one or more database files may migrated from the secondary storage system to a server hosting the upgraded version of the database. The secondary storage system may be used to migrate the data associated with the one or more databases files instead of the primary system to free up system resources of the primary system for other purposes, such as to respond to one or more database requests. The migrated data associated with the one or more database files may correspond to a latest version of the one or more database files, i.e., a complete version of the one or more database files. Because a view associated with a backup snapshot is a fully hydrated backup, the latest version of the one or more databases files may be provided without having to rebuild the file using a full backup and one or more incremental backups.

One or more users associated with the database hosted on the primary system may continue to use the database (i.e., the first database version) while the data associated with the one or more database files is being migrated in the background from the secondary storage system to the server hosting the upgraded version of the database.

At 604, one or more subsequent backup snapshots are received from the primary system. The primary system may perform one or more subsequent incremental backup snapshots to the secondary storage system while the data associated with the one or more database files is being migrated in the background from the secondary storage system to the server hosting the upgraded version of the database. The one or more subsequent incremental backup snapshots may include data associated with the one or more database files that was not previously backed up.

At 606, a tree data structure is updated based on the one or more subsequent backup snapshots. The one or more received backup snapshots may include data associated with one or more database files that was not previously backed up. A tree data structure associated with the one or more database files may be updated based on the data associated with the one or more database files that was not previously backed up.

When a backup snapshot is received, a new root node associated with a file metadata tree corresponding to the backup snapshot may be created and the root node of the file metadata tree may be linked to one or more intermediate nodes associated with a previous file metadata tree. The previous file metadata tree may correspond to a version of a database file included in a previous backup snapshot. A file metadata tree is a snapshot structure that stores the metadata associated with a database file and can be used to capture different versions of the database file at different moments in time. The tree data structure may allow allows a chain of file metadata trees corresponding to different versions of a database file to be linked together by allowing a node of a later version of a file metadata tree corresponding to a later version of a database file to reference a node of a previous file metadata tree corresponding to a previous version of the database file.

At 608, the data associated with the one or more subsequent backup snapshots is migrated. The data associated with the one or more subsequent backup snapshots may correspond to a remaining portion of one or more database files that was not included in the initial migration of the data associated with the one or more database files. The remaining portion represents the portion of the one or more database files needed to make the one or more database files that are stored on the primary system consistent with the one or more database files that are stored on the server hosting the upgraded version of the database.

The secondary storage system may traverse the tree data structure associated with a version of a database file that was included in the one or more subsequent backup snapshots. The secondary storage system may traverse the tree from a root node associated with one of the one or more subsequent backup snapshots to identify data that was not included in the initial migration of the one or more database files. The identified data may be migrated from the secondary storage system to the server hosting the upgraded version of the database.

Figure 7:
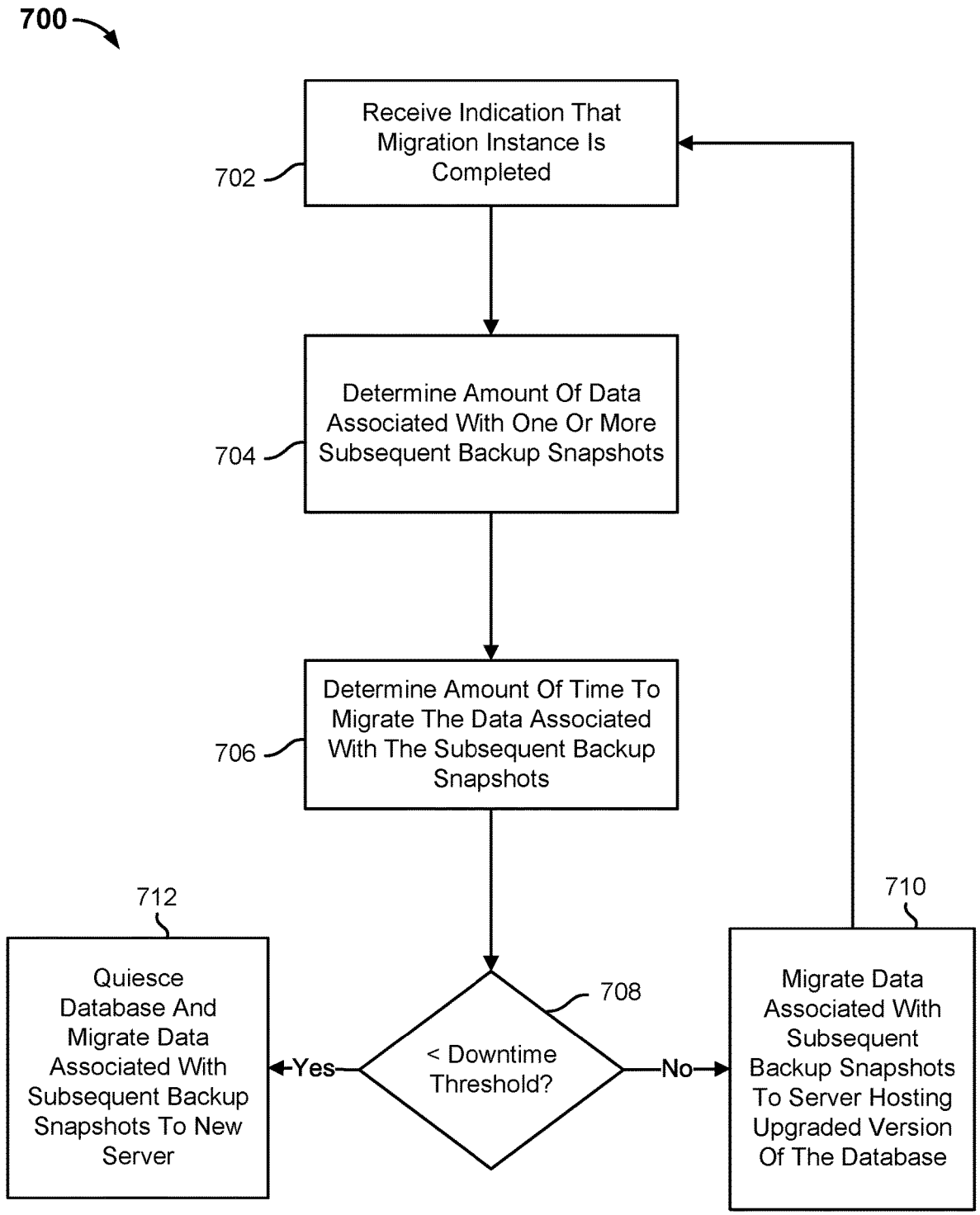
FIG. 7 is a flow chart illustrating a process for completing a migration of database content accordance with some embodiments.

FIG. 7 is a flow chart illustrating a process for completing a migration of database content in accordance with some embodiments. In the example shown, process 700 may be implemented by a storage system, such as secondary storage system 112. In some embodiments, process 700 may be implemented to perform some or all of step 608 of process 600.

At 702, an indication that a migration instance is completed is received. An operator associated with the database hosted on a primary system may desire to use an upgraded version of the database hosted on a second server. The second server may provide the indication to a secondary storage system that was performing the data migration. In other embodiments, a data migration module of the secondary storage system may provide the indication that the data migration instance is complete to one or more processors of the secondary storage system.

At 704, an amount of data associated with one or more subsequent backup snapshots is determined. One or more users associated with the database hosted on a primary system may continue to use the database (i.e., the first database version) while the data associated with the one or more database files is being migrated in the background from the secondary storage system to the server hosting the upgraded version of the database. The primary system may also perform one or more incremental backup snapshots to the secondary storage system while the data associated with the one or more database files is being migrated in the background from the secondary storage system to the server hosting the upgraded version of the database. The one or more incremental backup snapshots may include data associated with the one or more database files that was not previously backed up.

After the initial data migration is completed, the one or more database files that are stored on the primary system may be inconsistent with the one or more database files that are stored on the server hosting the upgraded version of the database. A remaining portion of the one or more database files corresponds to the additional portion of the one or more database files that was included in the one or more subsequent backup snapshots. The remaining portion represents the portion of the one or more database files needed to make the one or more database files that are stored on the current database server consistent with the one or more database files that are stored on the server hosting the upgraded version database.

At 706, an amount of time to migrate the data associated with the one or more subsequent backup snapshots is determined. The secondary storage system may provide to an application associated with an operator of the current version of the database an estimated amount of time to migrate a remaining portion of the one or more database files.

At 708, it is determined whether the amount of time to migrate the data associated with the one or more subsequent backup snapshots is less than a downtime threshold.

In some embodiments, the application associated with an operator of the current version of the database may provide to the operator an option to quiesce the database and migrate the remaining portion from the secondary storage system to the server hosting the upgraded version of the database. The operator may decline to quiesce the database because the amount of downtime associated with the database is too long. For example, it may take an hour to migrate the remaining portion of the one or more database files. In the event the operator of the current version of the database declines to quiesce the database and migrate the remaining portion of the one or more database files, process 700 proceeds to 710. In the event the operator of the current version of the database agrees to quiesce the database and migrate the remaining portion of the one or more database files, process 700 proceeds to 712.

In other embodiments, the database is automatically quiesced and the remaining portion of the one or more database files is migrated from the secondary storage system to the server hosting the upgraded database in the event the amount of downtime associated with the data migrate is less than a downtime threshold (e.g., 1 minute). The downtime threshold may be specified by an operator associated with the database. In the event the amount of downtime associated with the data migration is not less than a downtime threshold, process 700 proceeds to 710. In the event the amount of downtime associated with the data migration is less than a downtime threshold, process 700 proceeds to 712.

At 710, the secondary storage system may be configured to migrate the remaining portion of the one or more database files and the one or more users associated with the database may continue to use the database while the remaining portion of the one or more database files is being migrated in the background from the secondary storage system to the server hosting the upgraded version of the database. The primary system database server may also perform one or more incremental backup snapshots while the remaining portion of the one or more database files is being migrated in the background from the secondary storage system to the server hosting the upgraded version of the database. The one or more incremental backup snapshots may include data associated with the one or more database files that was not previously backed up.

At 712, the database is quiesced and the data associated with the one or more subsequent backup snapshots is migrated to the new server. In some embodiments, in the event the operator of the current version of the database agrees to quiesce the database and migrate the remaining portion of the one or more database files (e.g., the amount of downtime is not too long), the database is quiesced and the secondary storage system migrates the remaining portion of the one or more database files to the server hosting the upgraded database. The operator of the current version of the database and upgraded version of the database may decide that the amount of downtime is acceptable.

In other embodiments, the database is automatically quiesced and the remaining portion of the one or more database files is migrated from the secondary storage system to the server hosting the upgraded database in the event the amount of downtime associated with the data migrate is less than a downtime threshold (e.g., 1 minute).

The one or more database files stored on the primary system may include data that was not included in a backup snapshot. In some embodiments, a last incremental backup snapshot is performed and that data is stored on the secondary storage system and included in the data migration. In other embodiments, the data that was not included in a backup snapshot is provided from the current database server to the server hosting the upgraded database. A change block tracker of the primary system may identify the data associated with the one or more database files that has not been backed up.

After the data migration is completed, the one or more users associated with the database may be reassigned to become one or more users associated with the upgraded version of the database.

Each time the remaining portion is migrated and the one or more users continue to use the database, the amount of downtime associated with the next migration may decrease. For example, it may take 10 hours to perform an initial migration instance that includes an the initial portion of the one or more database files, a hour to perform a second migration instance that includes a first remaining portion of the one or more database files, thirty minutes to perform a third migration instance that includes a second remaining portion of the one or more database files, . . . , and less than a minute to perform an nth migration instance that includes an (n−1)th remaining portion of the one or more database files. The technique to reduce the amount of downtime associated with upgrading from a first database version to a second database version not only reduces the amount of downtime associated with a database, but also ensures that the one or more database files stored on the primary system and the one or more database files stored on the server hosting the upgraded database are in sync with each other before additional changes are made to the one or more databases files.

Figure 8:
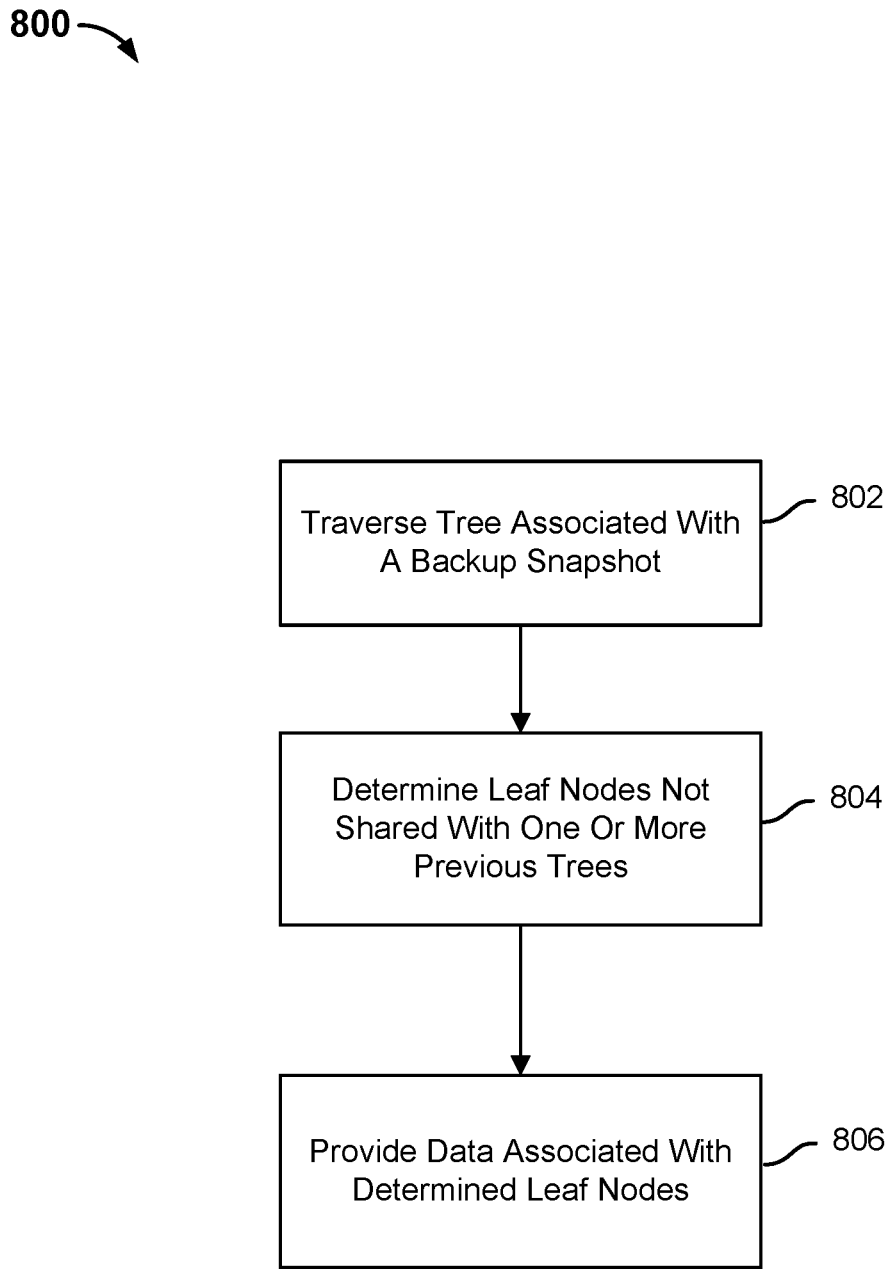
FIG. 8 is a flow chart illustrating a process for determining changes associated with a database file in accordance with some embodiments.

FIG. 8 is a flow chart illustrating a process for determining changes associated with a database file in accordance with some embodiments. In the example shown, process 800 may be implemented by a storage system, such as secondary storage system 112. In some embodiments, process 800 may be implemented to perform a portion of step 508 of process 500 or a portion of step 608 of process 600.

At 802, a tree associated with a backup snapshot is traversed. The tree associated with the backup snapshot may be traversed to determine data associated with one or more database files that was not previously backed up in a previous backup snapshot. A tree is a representation of a fully hydrated backup because it provides a complete view of the primary system at a particular moment in time. A fully hydrated backup is a backup that is ready for use without having to reconstruct a plurality of backups to use it. Any file stored on the primary system at a particular time and the file's contents, for which there is an associated backup snapshot, may be determined from the tree, regardless if the associated backup snapshot was a full backup snapshot or an incremental backup snapshot. Creating an incremental backup snapshot of a primary system may only include copying data of the primary system that was not previously backed up. However, a tree associated with an incremental backup snapshot provides a complete view of the primary system at the particular moment in time because it includes references to data of the primary system that was previously stored. For example, a root node associated with the file system metadata snapshot tree may include one or more references to nodes associated with one or more previous backup snapshots and one or more references to nodes associated with the current backup snapshot. A tree associated with a backup snapshot has a particular root node. The particular root node has an associated view identifier. The view identifier is associated with a particular backup snapshot. The tree associated with the backup snapshot is traversed to identify nodes of the tree that have the same view identifier as the root node associated with the backup snapshot.

At 804, one or more leaf nodes not shared with one or more previous trees are determined. The one or more leaf nodes not shared with one or more previous trees are the one or more leaf nodes that have the same view identifier as the root node of the tree associated with the backup snapshot. The one or more leaf nodes not shared with one or more previous trees include corresponding references to data bricks. A data brick includes one or more data chunks.

The corresponding data bricks included in the one or more leaf nodes not shared with one or more previous trees correspond to data that was included in the backup snapshot. The one or more data chunks may correspond to data associated with one or more database files that was not previously migrated.

At 806, data associated with the one or more determined leaf nodes is provided.

A leaf node of a file metadata tree may include an identifier of a data brick associated with one or more data chunks of the file. A data brick may include one or more data chunks. The location of the data brick may be identified using a data structure (e.g., list, table, etc.) stored in a metadata store that matches data brick identifiers to a physical storage location. In some embodiments, the data structure associates brick identifiers with chunk identifiers (e.g., hashes). The data structure or a different data structure may associate chunk identifiers with a brick offset. A chunk may be associated with a chunk table, which contains a corresponding chunk file ID. The chunk file ID is associated with a chunk file table, which indicates the location of the data (e.g., an offset in a data brick). The data associated with the one or more determined leaf nodes may be identified based on the brick information and provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving, at a storage system, a request to migrate database content associated with a first server to a second server;

migrating data associated with one or more backed up versions of the database content from the storage system to the second server hosting an updated version of a database while backing up one or more new versions of the database content from the first server hosting a previous version of the database to the storage system until an amount of time to migrate data associated with a latest backed up version of the database content that was backed up from the first server to the storage system is less than a downtime threshold, wherein migrating the data associated with the one or more backed up versions of database content from the storage system to the second server hosting the updated version of the database includes determining the amount of time to migrate the data associated with the latest backed up version of the database content that was backed up from the first server to the storage system; and in response to determining that the amount of time to migrate the data associated with the latest backed up version of the database content that was backed up from the first server to the storage system is less than the downtime threshold, providing from the storage system to the second server hosting the updated version of the database the data associated with the latest backed up version of the database content that was backed up from the first server to the storage system, wherein one or more users associated with the previous version of the database are reassigned from the previous version of the database hosted on the first server to the updated version of the database hosted on the second server.

2. The method of claim 1, wherein the one or more new versions of the database content are based on one or more incremental backups of the database content.

3. The method of claim 1, wherein the data associated with the latest backed up version of the database content corresponds to database content that changed between the latest backed up version of the database content and one or more previous versions of the database content.

4. The method of claim 1, wherein the one or more users associated with the previous version of the database are assigned to the previous version of the database while the one or more new versions of the database content are backed up from the first server hosting the previous version of the database to the storage system.

5. The method of claim 1, wherein the one or more backed up versions of the database content are backed up from the first server hosting the previous version of the database to the storage system.

6. The method of claim 1, wherein the previous version of the database is accessible by the one or more users while the data associated with the one or more backed up versions of database content is being migrated from the storage system to the second server hosting the updated version of the database.

7. The method of claim 1, wherein the previous version of the database is quiesced before the data associated with the latest backed up version of the database content is provided to the second server hosting the updated version of the database.

8. The method of claim 1, further comprising providing to an operator associated with the first server hosting the previous version of the database a notification that includes an estimated amount of time to migrate the data associated with the latest backed up version of the database content.

9. The method of claim 8, further comprising receiving an indication to migrate the data associated with the latest backed up version of the database content.

10. The method of claim 1, wherein a rate at which the first server hosting the previous version of the database is configured to perform an incremental backup is adjusted in response to a migration of the data associated with an initial backed up version of the database content being initiated.

11. The method of claim 1, wherein the one or more backed up versions of the database content are associated with a corresponding tree data structure.

12. The method of claim 11, wherein the data associated with the one or more backed up versions of database content is migrated in part by traversing tree data structures associated with the one or more backed up versions of the database content to locate the data associated with the one or more backed up versions of database content.

13. A computer program product, the computer program product comprising a non-transitory computer readable storage medium and comprising computer instructions for:
receiving a request to migrate database content associated with a first server to a second server;
migrating data associated with one or more backed up versions of the database content from a storage system to the second server hosting an updated version of a database while backing up one or more new versions of the database content from the first server hosting a previous version of the database to the storage system until an amount of time to migrate data associated with a latest backed up version of the database content that was backed up from the first server to the storage system is less than a downtime threshold, wherein migrating the data associated with the one or more backed up versions of database content from the storage system to the second server hosting the updated version of the database includes determining the amount of time to migrate the data associated with the latest backed up version of the database content that was backed up from the first server to the storage system; and
in response to determining that the amount of time to migrate the data associated with the latest backed up version of the database content that was backed up from the first server to the storage system is less than the downtime threshold, providing from the storage system to the second server hosting the updated version of the database the data associated with the latest backed up version of the database content that was backed up from the first server to the storage system, wherein one or more users associated with the previous version of the database are reassigned from the previous version of the database hosted on the first server to the updated version of the database hosted on the second server.

14. The computer program product of claim 13, wherein the one or more new versions of the database content are based on one or more incremental backups of the database content.

15. The computer program product of claim 13, wherein the data associated with the latest backed up version of the database content corresponds to database content that changed between the latest backed up version of the database content and one or more previous versions of the database content.

16. The computer program product of claim 13, wherein the one or more users associated with the previous version of the database are assigned to the previous version of the database while the one or more new versions of the database content are backed up from the first server hosting the previous version of the database to the storage system.

17. The computer program product of claim 13, wherein the one or more backed up versions of the database content are backed up from the first server hosting the previous version of the database to the storage system.

18. The computer program product of claim 13, wherein the previous version of the database is quiesced before the data associated with the latest backed up version of the database content is provided to the second server hosting the updated version of the database.

19. A storage system, comprising:
a processor configured to:
receive a request to migrate database content associated with a first server to a second server;
migrate data associated with one or more backed up versions of the database content from the storage system to the second server hosting an updated version of a database while backing up one or more new versions of the database content from the first server hosting a previous version of the database to the storage system until an amount of time to migrate data associated with a latest backed up version of the database content that was backed up from the first server to the storage system is less than a downtime threshold, wherein migrating the data associated with the one or more backed up versions of database content from the storage system to the second server hosting the updated version of the database includes determining the amount of time to migrate the data associated with the latest backed up version of the database content that was backed up from the first server to the storage system; and
in response to a determination that the amount of time to migrate the data associated with the latest backed up version of the database content that was backed up from the first server to the storage system is less than the downtime threshold, providing from the storage system to the second server hosting the updated version of the database the data associated with the latest backed up version of the database content that was backed up from the first server to the storage system, wherein one or more users associated with the previous version of the database are reassigned from the previous version of the database hosted on the first server to the updated version of the database hosted on the second server; and
a memory coupled to the processor and configured to provide the processor with instructions.

* * * * *